US012610383B2

(12) United States Patent
Zhao et al.

(10) Patent No.:  US 12,610,383 B2
(45) Date of Patent:    Apr. 21, 2026

(54) PHYSICAL SIDELINK FEEDBACK CHANNEL (PSFCH) TRANSMISSION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 328 days.

(21) Appl. No.: 18/382,115

(22) Filed: Oct. 20, 2023

(65) Prior Publication Data

US 2024/0049264 A1     Feb. 8, 2024

Related U.S. Application Data

(63) Continuation of application No. PCT/CN2021/089015, filed on Apr. 22, 2021.

(51) Int. Cl.
*H04W 72/40*       (2023.01)
*H04W 72/0453*     (2023.01)

(52) U.S. Cl.
CPC ....... *H04W 72/40* (2023.01); *H04W 72/0453* (2013.01)

(58) Field of Classification Search
CPC .. H04W 72/40; H04W 72/0453; H04L 1/189; H04L 1/1896; H04L 1/1861; H04L 5/0055
See application file for complete search history.

(56) References Cited

U.S. PATENT DOCUMENTS 12,193,055 B2 *   1/2025  Liu ...................... H04L 1/0041
2012/0057547 A1 *  3/2012  Lohr ..................... H04W 72/04
                                             370/329
(Continued)

FOREIGN PATENT DOCUMENTS

CN        111970094 A    11/2020
KR     20200054034 A     5/2020
(Continued)

OTHER PUBLICATIONS

Extended European Search Report dated May 28, 2024 received in European Patent Application No. EP21937345.3.
(Continued)

*Primary Examiner* — Ayaz R Sheikh
*Assistant Examiner* — Tarell A Hampton
(74) *Attorney, Agent, or Firm* — Sheppard, Mullin, Richter & Hampton LLP

(57)        ABSTRACT

A Physical Sidelink Feedback Channel (PSFCH) transmission method and a terminal device. The method includes: receiving, by a first terminal, Physical Sidelink Shared Channel(s) (PSSCH(s)) transmitted by a second terminal on a plurality of carriers; determining, by the first terminal, to transmit a first PSFCH to the second terminal on a first carrier, the first PSFCH including feedback information for a first PSSCH, and the first PSSCH including at least one PSSCH transmitted on at least one of the plurality of carriers; determining, by the first terminal, a target transmission resource for transmitting the first PSFCH on the first carrier; and transmitting, by the first terminal, a first PSFCH on the target transmission resource on the first carrier.

20 Claims, 10 Drawing Sheets

(56) References Cited

U.S. PATENT DOCUMENTS

| | | | | |
|---|---|---|---|---|
| 2012/0294252 | A1* | 11/2012 | Kwon | H04L 5/0053 |
| | | | | 370/329 |
| 2013/0039321 | A1* | 2/2013 | Kim | H04L 5/0042 |
| | | | | 370/329 |
| 2013/0215759 | A1* | 8/2013 | Wang | H04L 1/1621 |
| | | | | 370/241 |
| 2017/0289972 | A1* | 10/2017 | Lei | H04L 5/0094 |
| 2019/0223207 | A1* | 7/2019 | Huang | H04L 5/0053 |
| 2020/0205166 | A1* | 6/2020 | Huang | H04W 68/005 |
| 2020/0403737 | A1* | 12/2020 | Yeo | H04W 52/383 |
| 2021/0007081 | A1 | 1/2021 | Shin et al. | |
| 2021/0144745 | A1* | 5/2021 | Yang | H04L 5/0053 |
| 2021/0203453 | A1* | 7/2021 | Kim | H04L 5/0055 |
| 2021/0288778 | A1* | 9/2021 | Park | H04L 1/1861 |
| 2021/0314921 | A1* | 10/2021 | Yang | H04W 72/02 |
| 2021/0320821 | A1* | 10/2021 | Lee | H04L 25/0204 |
| 2021/0345360 | A1* | 11/2021 | Yeo | H04W 72/1215 |
| 2021/0345407 | A1* | 11/2021 | Myung | H04L 27/2607 |
| 2022/0190970 | A1* | 6/2022 | Hosseini | H04L 1/1812 |
| 2022/0200737 | A1* | 6/2022 | Hosseini | H04L 1/1664 |
| 2022/0330261 | A1* | 10/2022 | Yeo | H04W 72/543 |
| 2022/0417976 | A1* | 12/2022 | Park | H04L 5/0053 |
| 2023/0164816 | A1* | 5/2023 | Hwang | H04L 1/1816 |
| | | | | 370/330 |
| 2024/0073887 | A1* | 2/2024 | Bae | H04W 72/1268 |

FOREIGN PATENT DOCUMENTS

| | | | |
|---|---|---|---|
| WO | 2019134448 | A1 | 7/2019 |
| WO | 2021018096 | A1 | 2/2021 |
| WO | 2022133377 | A1 | 6/2022 |

OTHER PUBLICATIONS

International Search Report and Written Opinion dated Dec. 24, 2021 in International Application No. PCT/CN2021/089015.

ITL."Physical Layer Procedure for NR V2X" 3GPP TSG RAN WG1 #98bis R1-1910797, Oct. 7, 2019 (Oct. 7, 2019), 6 pages, entire document.

"3rd Generation Partnership Project; Technical Specification Group Radio Access Network;NR;Physical layer procedures for control(Release 16)",3GPP TS 38.213 V16.4.0 (Dec. 2020), 181 pages.

"3rd Generation Partnership Project; Technical Specification Group Radio Access Network;NR;Physical layer procedures for control(Release 16)"3GPP TS 38.213 V16.5.0 (Mar. 2021), 183 pages.

Office Action issued by the European Patent Office for Application No. 21937345.3 mailed on Mar. 7, 2025.

Office Action issued by the European Patent Office for Application No. 21937345.3 mailed on Sep. 11, 2025.

* cited by examiner (a)

(b)

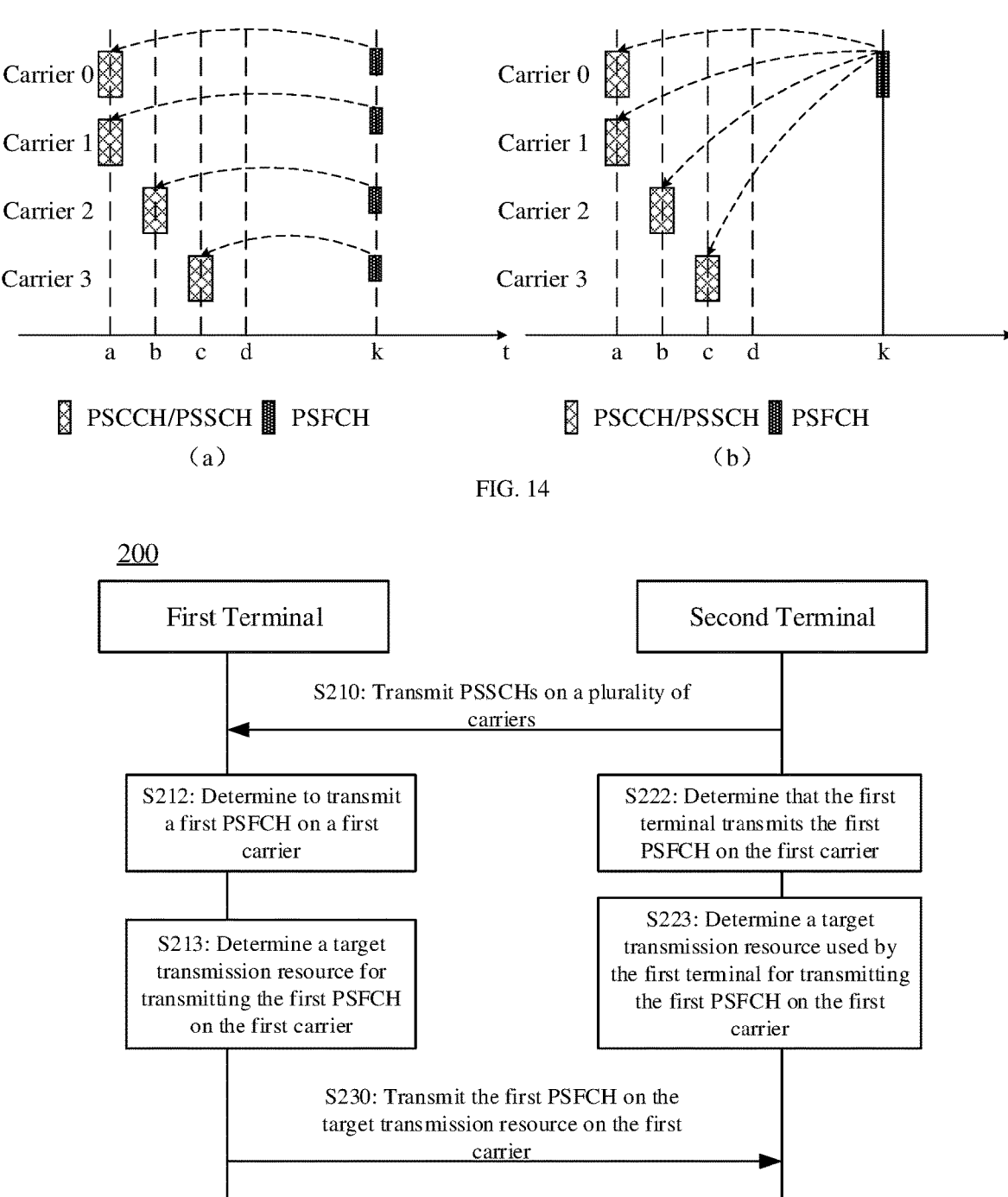

PSCCH/PSSCH ▓ PSFCH                    PSCCH/PSSCH ▓ PSFCH (a)                                    (b)

| First Terminal | Second Terminal |
|---|---|

S210: Transmit PSSCHs on a plurality of carriers

| S212: Determine to transmit a first PSFCH on a first carrier | S222: Determine that the first terminal transmits the first PSFCH on the first carrier |
|---|---|

| S213: Determine a target transmission resource for transmitting the first PSFCH on the first carrier | S223: Determine a target transmission resource used by the first terminal for transmitting the first PSFCH on the first carrier |
|---|---|

S230: Transmit the first PSFCH on the target transmission resource on the first carrier

FIG. 15

Carrier 0

Slot 0    Slot 1         Slot 2    Slot 3    Slot 4    Slot 5         Slot 6    Slot 7    Slot 8    Slot 9         Slot 10   Slot 11

Carrier 1

Slot 0              Slot 1              Slot 2              Slot 3              Slot 4              Slot 5

PSCCH/PSSCH          PSFCH

FIG. 16

Slot 0    Slot 1         Slot 2    Slot 3    Slot 4    Slot 5         Slot 6    Slot 7

(a)

Slot 0    Slot 1    Slot 2    Slot 3    Slot 4    Slot 5    Slot 6    Slot 7

(b)

PSCCH/PSSCH          PSFCH Format 0          PSFCH Format 1

FIG. 17

Frequency 0  1  2  3  4  5  6  7  8  9  10 11 12 13 14 15 16 17 18 19

PRB Set for
PSFCH

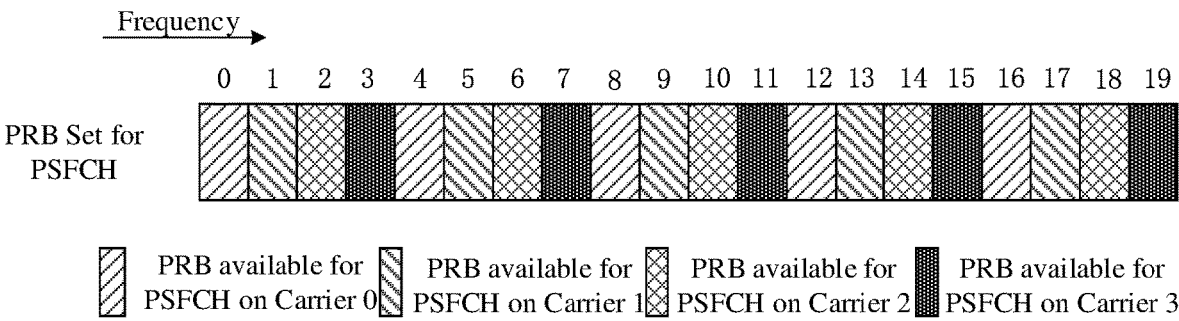

PRB available for          PRB available for          PRB available for          PRB available for
PSFCH on Carrier 0    PSFCH on Carrier 1    PSFCH on Carrier 2    PSFCH on Carrier 3

FIG. 18

PHYSICAL SIDELINK FEEDBACK CHANNEL (PSFCH) TRANSMISSION METHOD AND TERMINAL DEVICE

CROSS-REFERENCE TO RELATED APPLICATIONS

This application is a continuation of International Application No. PCT/CN2021/089015 filed on Apr. 22, 2021, which is incorporated herein by reference in entirety.

TECHNICAL FIELD

The embodiments of the present disclosure relate to communication technology, and more particularly, to a Physical Sidelink Feedback Channel (PSFCH) transmission method and a terminal device.

BACKGROUND

In the New Radio (NR) Sidelink (SL) system, sidelink multi-carrier transmission is introduced to improve the throughput of sidelink transmission. For example, a terminal may transmit Physical Sidelink Shared Channel(s) (PSSCH (s)) on the plurality of carriers. If each PSSCH requires sidelink feedback, how to determine transmission resources to be used for sidelink feedback channels for the PSSCH(s) is a problem to be solved.

SUMMARY

The present disclosure provides a Physical Sidelink Feedback Channel (PSFCH) transmission method and a terminal device.

In a first aspect, a Physical Sidelink Feedback Channel (PSFCH) transmission method is provided. The method includes: receiving, by a first terminal, Physical Sidelink Shared Channel(s) (PSSCH(s)) transmitted by a second terminal on a plurality of carriers; determining, by the first terminal, to transmit the first PSFCH to the second terminal on a first carrier, the first PSFCH including feedback information for a first PSSCH, and the first PSSCH including at least one PSSCH transmitted on at least one of the plurality of carriers; determining, by the first terminal, a target transmission resource for transmitting the first PSFCH on the first carrier; and transmitting, by the first terminal, the first PSFCH on the target transmission resource on the first carrier.

In a second aspect, A Physical Sidelink Feedback Channel (PSFCH) transmission method is provided. The method includes: transmitting, by a second terminal, Physical Sidelink Shared Channel(s) (PSSCH(s)) to a first terminal on a plurality of carriers; determining, by the second terminal, that the first terminal transmits the first PSFCH to the second terminal on a first carrier, the first PSFCH including feedback information for a first PSSCH, and the first PSSCH including at least one PSSCH transmitted on at least one of the plurality of carriers; determining, by the second terminal, a target transmission resource used by the first terminal for transmitting the first PSFCH on the first carrier; and receiving, by the second terminal, the first PSFCH on the target transmission resource on the first carrier.

In a third aspect, a terminal device is provided. The terminal device includes a processor and a memory, the memory has a computer program stored thereon, and the processor is configured to invoke and execute the computer program stored in the memory to perform a Physical Sidelink Feedback Channel (PSFCH) transmission method including: receiving Physical Sidelink Shared Channel(s) (PSSCH(s)) transmitted by a second terminal on a plurality of carriers; determining to transmit a first PSFCH to the second terminal on a first carrier, the first PSFCH including feedback information for a first PSSCH, and the first PSSCH including at least one PSSCH transmitted on at least one of the plurality of carriers; determining a target transmission resource for transmitting the first PSFCH on the first carrier; and transmitting the first PSFCH on the target transmission resource on the first carrier.

BRIEF DESCRIPTION OF DRAWINGS

FIG. 14 is a schematic diagram showing a feedback scheme of multi-carrier transmission according to the present disclosure.

FIG. 15 is a schematic interaction diagram illustrating a PSFCH transmission method according to an embodiment of the present disclosure.

FIG. 16 is a schematic diagram showing a scheme for determining a target transmission resource for a PSFCH according to an embodiment of the present disclosure.

FIG. 17 is a schematic diagram showing a PSFCH format according to the embodiment of the present disclosure.

FIG. 18 is a schematic diagram showing another scheme for determining a target transmission resource for a PSFCH according to an embodiment of the present disclosure.

DESCRIPTION OF EMBODIMENTS

Figures 1, 2, 3:
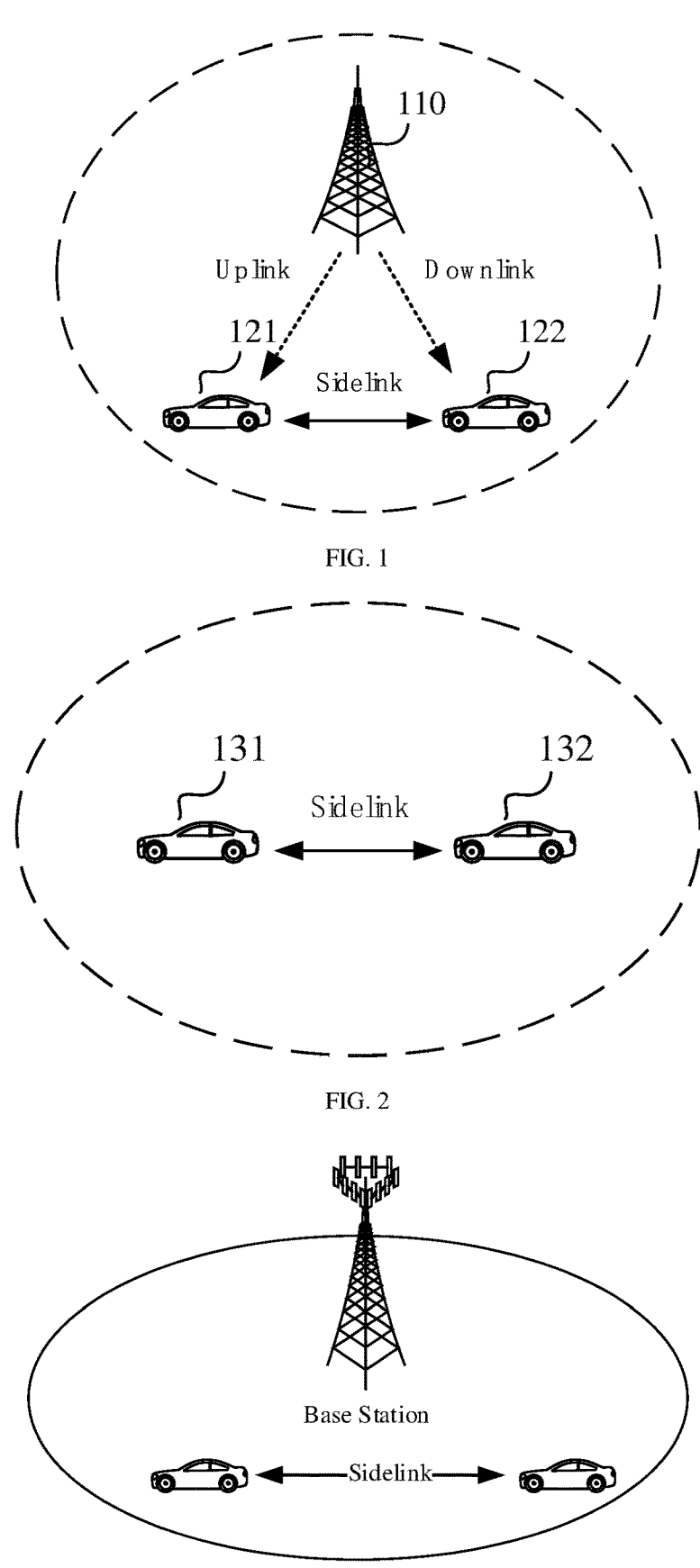
FIG. 1 is a schematic diagram showing a communication system architecture according to the present disclosure.
FIG. 2 is a schematic diagram showing another communication system architecture according to the present disclosure.
FIG. 3 is a schematic diagram showing sidelink communication within network coverage according to the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5$^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "pre-defined" or "preconfigured" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

FIG. 1 is a schematic diagram showing a communication system to which the embodiment of the present disclosure can be applied. Transmission resources for vehicle-mounted terminals (vehicle-mounted terminals 121 and 122) are allocated by a base station 110, and the vehicle-mounted terminals transmit data on a sidelink according to the resources allocated by the base station 110. Specifically, the base station 110 may allocate resources for a single transmission to the terminals, or may allocate resources for semi-static transmissions to the terminals.

FIG. 2 is a schematic diagram showing another communication system to which the embodiment of the present disclosure can be applied. The vehicle-mounted terminals (vehicle-mounted terminal 131 and vehicle-mounted terminal 132) autonomously select transmission resources from sidelink resources for data transmission. Optionally, the vehicle-mounted terminals may select transmission resources randomly, or select transmission resources by means of sensing.

Figures 4, 5, 6:
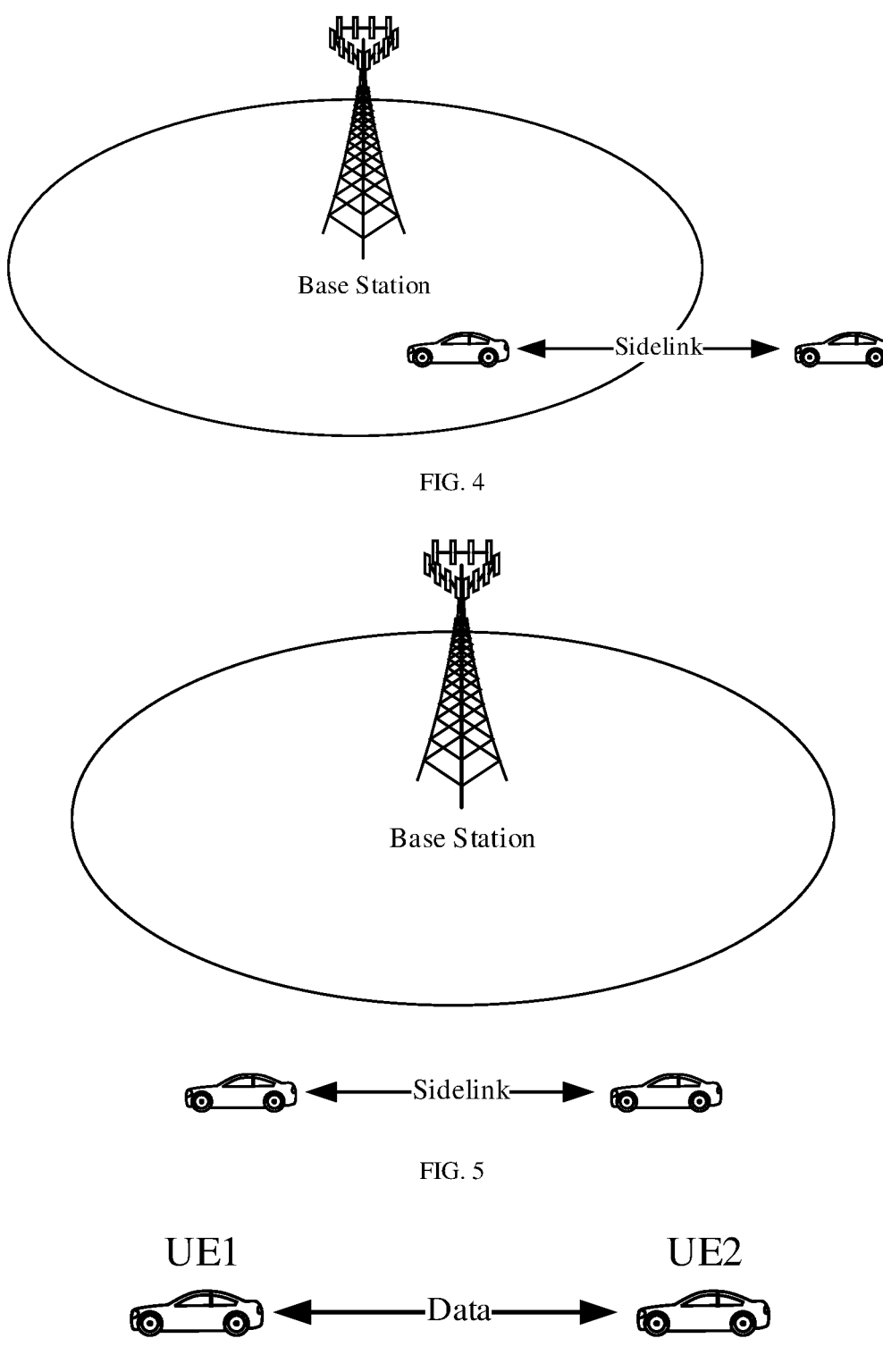
FIG. 4 is a schematic diagram showing sidelink communication with partial network coverage according to the present disclosure.
FIG. 5 is a schematic diagram showing sidelink communication out of network coverage according to the present disclosure.
FIG. 6 is a schematic diagram showing unicast sidelink communication according to the present disclosure.

It should be noted that, depending on the network coverage status of communicating terminals, sidelink communications can be divided into sidelink communication within network coverage, as shown in FIG. 3; sidelink communication with partial network coverage, as shown in FIG. 4; and sidelink communication out of network coverage, as shown in FIG. 5.

FIG. 3: In the sidelink communication within network coverage, all terminals performing sidelink communication are within the coverage of one base station, and thus all the terminals can perform sidelink communication based on a same sidelink configuration by receiving configuration signaling from the base station.

FIG. 4: In the sidelink communication with partial network coverage, some terminals performing sidelink communication are located within the coverage of the base station. These terminals can receive configuration signaling from the base station and perform sidelink communication according to the configuration of the base station. However, terminals located outside the network coverage cannot receive configuration signaling from the base station. In this case, the terminals outside the network coverage will use pre-configuration information and information carried in a Physical Sidelink Broadcast Channel (PSBCH) transmitted by the terminals located with the network coverage to determine the sidelink configuration for sidelink communication.

FIG. 5: For sidelink communication out of network coverage, all terminals performing sidelink communication are located outside the network coverage, and all the terminals determine the sidelink configuration based on pre-configuration information for sidelink communication.

It should be noted that device-to-device communication is a Sidelink (SL) transmission technology based on Device to Device (D2D), which is different from the traditional cellular system in which communication data is received or transmitted via a base station and has higher spectral efficiency and lower transmission delay. The V2X system adopts the scheme of direct terminal-to-terminal communication, and two transmission modes are defined in 3GPP: Mode 1 and Mode 2.

Mode 1: Transmission resources of a terminal are allocated by a base station, and the terminal transmits data on a sidelink according to the resources allocated by the base station. The base station can allocate resources for a single transmission to the terminal, or allocate resources for semi-static transmissions to the terminal. As shown in FIG. 3, the terminal is located within the network coverage, and the network allocates transmission resources for sidelink transmission to the terminal.

Mode 2: A terminal selects resources from a resource pool for data transmission. As shown in FIG. 5, the terminal is located outside the cell coverage, and the terminal autonomously selects transmission resources from the pre-configured resource pool for sidelink transmission. Alternatively, as shown in FIG. 3, the terminal autonomously selects transmission resources from the resource pool configured by the network for sidelink transmission.

It should be noted that in NR-V2X, a terminal can be in a mixed mode, that is, it can use both Mode 1 and Mode 2 to obtain resources.

In NR-V2X, autonomous driving is supported, and thus higher requirements are imposed on data interaction between vehicles, such as higher throughput, lower latency, higher reliability, larger coverage, and more flexible resource allocation, etc.

Figures 7, 8, 9:
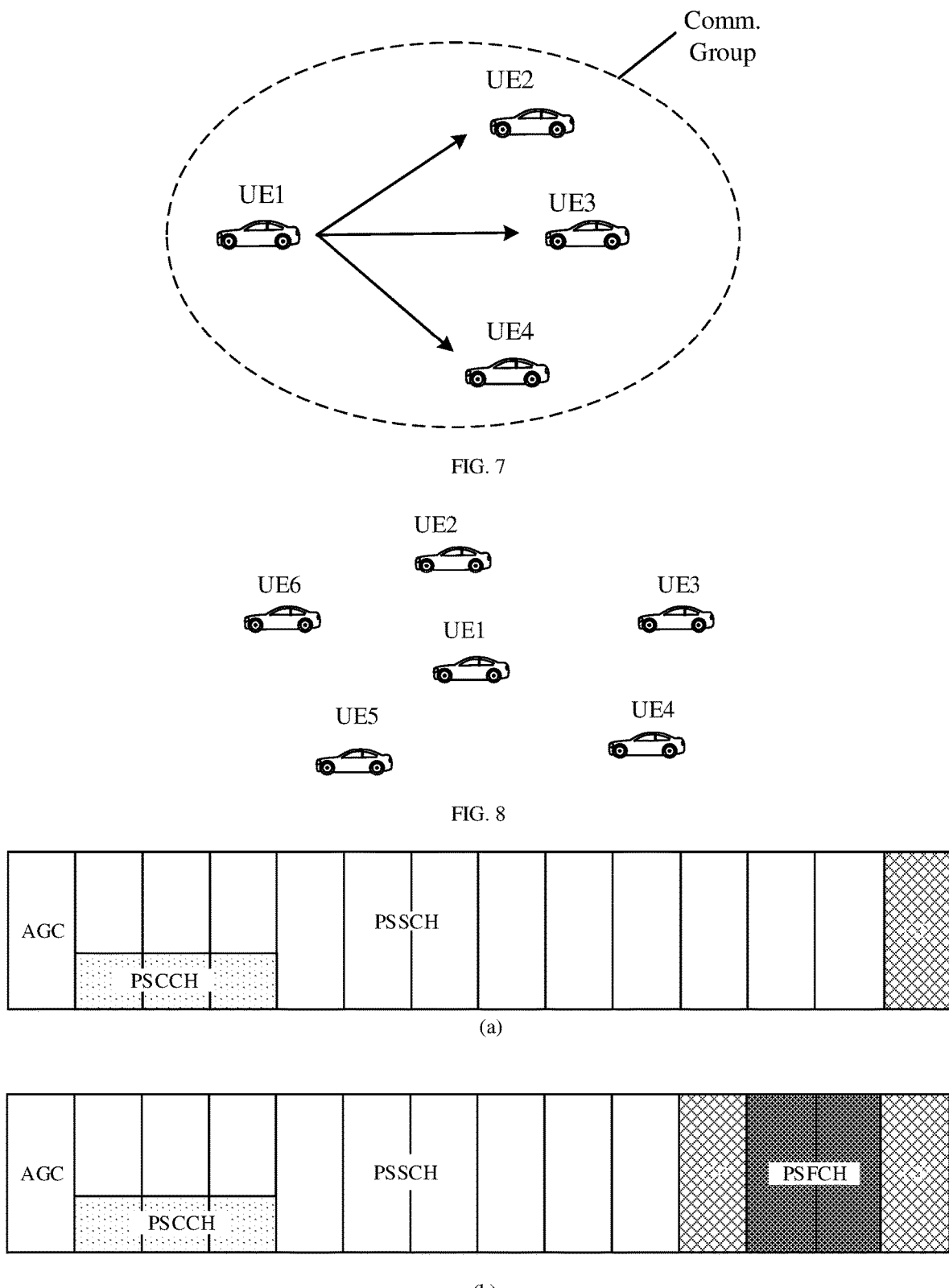
FIG. 7 is a schematic diagram showing multicast sidelink communication according to the present disclosure.
FIG. 8 is a schematic diagram showing broadcast sidelink communication according to the present disclosure.
FIG. 9 is a schematic diagram showing a slot structure of NR-V2X.

In LTE-V2X, broadcast transmission is supported, and in NR-V2X, unicast and multicast transmissions are introduced. For unicast transmission, there is only one terminal as the receiver, as shown in FIG. 6, in which unicast transmission is performed between UE1 and UE2. For multicast transmission, its receivers include all terminals in a communication group, or all terminals within a certain transmission distance, as shown in FIG. 7, in which UE1, UE2, UE3 and UE4 form a communication group, and UE1 transmits data, and other terminal devices in the group are receiving terminals. For broadcast transmission mode, its receivers include any terminal around the transmitting terminal, as shown in FIG. 8, in which UE1 is the transmitting terminal, and other terminals around it, UE2-UE6, are all receiving terminals.

In order to better understand the embodiments of the present disclosure, the slot structures in NR-V2X will be described with reference to FIG. 9.

In FIG. 9, (a) represents a slot structure not including a Physical Sidelink Feedback Channel (PSFCH); and (b) represents a slot structure including a PSFCH channel.

As shown in (a) in FIG. 9, the Physical Sidelink Control Channel (PSCCH) starts with the second sidelink symbol of the slot in the time domain and occupies 2 or 3 OFDM symbols, and may occupy {10, 12 15, 20, 25} Physical Resource Blocks (PRBs) in the frequency domain. In order to reduce the complexity of the UE's blind detection of the PSCCH, only one number of PSCCH symbols and one number of PRBs are allowed to be configured in one resource pool. In addition, since a sub-channel is the minimum granularity of resource allocation for the Physical Sidelink Shared Channel (PSSCH) in NR-V2X, the number of PRBs occupied by the PSCCH must be smaller than or equal to the number of PRBs in one sub-channel in the resource pool, so as not to impose additional restrictions on PSSCH resource selection or allocation. The PSSCH also starts with the second sidelink symbol of the slot in the time domain, the last time domain symbol in the slot is a Guard Period (GP) symbol, and the remaining symbols are mapped to the PSSCH. The first sidelink symbol in this slot is a repetition of the second sidelink symbol. Typically, the receiving terminal uses the first sidelink symbol as an Automatic Gain Control (AGC) symbol, and the data on the symbol is generally not used for data demodulation. The PSSCH occupies P subchannels in the frequency domain, and each subchannel includes Q consecutive PRBs, where P and Q are positive integers.

As shown in (b) in FIG. 9, when a slot contains a PSFCH, the second-to-last and third-to-last symbols in the slot are used for PSFCH transmission, and the time-domain symbol before the PSFCH channel is used as a GP symbol.

To facilitate better understanding of the embodiments of the present disclosure, the relevant Sidelink Control Information (SCI) of the present disclosure will be described.

Figure 10:
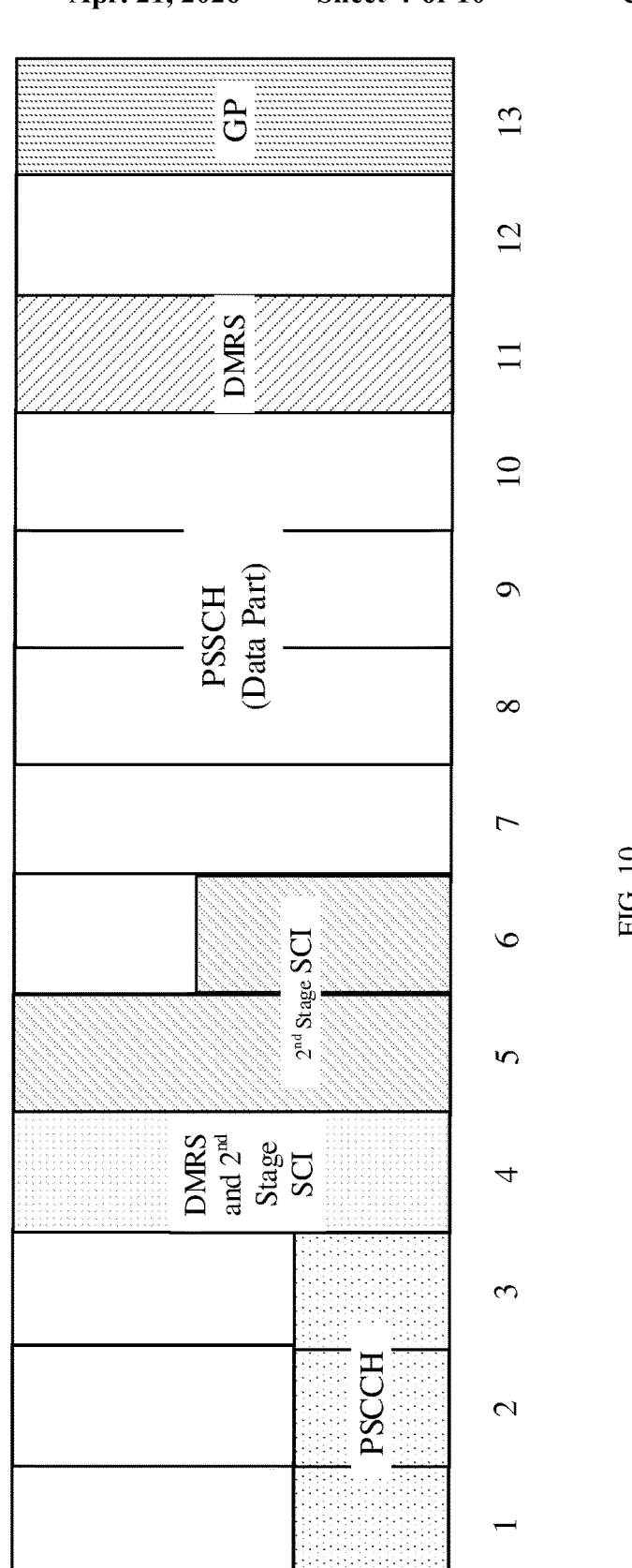
FIG. 10 is a schematic diagram showing a resource mapping of 2-stage SCI according to the present disclosure.

In NR-V2X, two-stage SCI is introduced. The first-stage SCI is carried in a PSCCH, and indicates transmission resources, reserved resource information, Modulation and Coding Scheme (MCS) level, priority and the like of a PSSCH. The second-stage SCI is transmitted in the resources of the PSSCH and demodulated using the Demodulation Reference Signal (DMRS) of the PSSCH, and indicates a transmitter Identity (ID) (also referred to as Source ID), a receiver ID (also referred to as Destination ID), a Hybrid Automatic Repeat reQuest (HARQ) ID, a New Data Indicator (NDI) and the like for data demodulation. The second-stage SCI is mapped starting from the first DMRS symbol of the PSSCH, first in the frequency domain and then in the time domain. As shown in FIG. 10, the PSCCH occupies 3 symbols (Symbol 1, Symbol 2, and Symbol 3), the DMRS of the PSSCH occupies Symbol 4 and Symbol 11, the second-stage SCI is mapped starting from Symbol 4 and frequency division multiplexed with the DMRS on Symbol 4, and the second-stage SCI is mapped to Symbol 4, Symbol 5, and Symbol 6. The resource size occupied by the second-stage SCI depends on the number of bits in the second-stage SCI.

In order to better understand the embodiments of the present disclosure, the PSFCH related to the present disclosure will be described.

Figure 11:
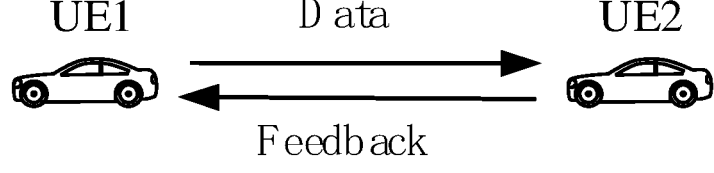
FIG. 11 is a schematic diagram showing sidelink feedback for unicast transmission.

In NR-V2X, in order to improve the reliability of sidelink transmission, a Sidelink Feedback Channel (PSFCH) is introduced. For example, as shown in FIG. 11, for unicast transmission, a transmitting terminal transmits sidelink data (including a PSCCH and a PSSCH) to a receiving terminal, the receiving terminal transmits HARQ feedback information (including an ACK or NACK) to the transmitting terminal, and the transmitting terminal determines whether retransmission is required according to the feedback information from the receiving terminal. Here, the HARQ feedback information is carried in a sidelink feedback channel, such as PSFCH.

In some embodiments, the sidelink feedback can be activated or deactivated by pre-configuration information or network configuration information or SCI transmitted by the transmitting terminal. If the sidelink feedback is activated, the receiving terminal receives the sidelink data transmitted by the transmitting terminal, and feeds back an HARQ ACK or NACK to the transmitting terminal according to a detection result, the transmitting terminal decides to transmit retransmission data or new data according to the feedback information from the receiving terminal. If the sidelink feedback is deactivated, the receiving terminal does not need to transmit feedback information, the transmitting terminal generally transmits data by means of blind retransmission. For example, the transmitting terminal repeatedly transmits each sidelink data K times, instead of deciding whether to transmit retransmission data according to the feedback information of the receiving terminal, where K is a positive integer.

Figure 12:
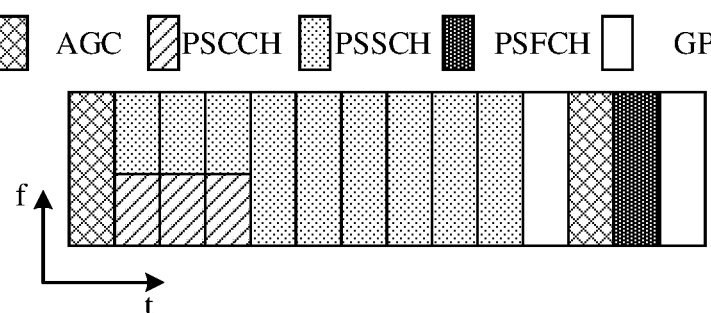
FIG. 12 is a schematic diagram showing a PSCCH/ PSSCH and a PSSCH slot structure according to the present disclosure.

In NR-V2X, the PSFCH is introduced, which only carries 1-bit HARQ-ACK information and occupies 2 time-domain symbols in the time domain (the second symbol carries sidelink feedback information, and the data on the first symbol is a copy of the data on the second symbol, but this symbol is used as AGC) and 1 PRB in the frequency domain. In one slot, the structures of PSFCH and PSSCH/PSCCH are shown in FIG. 12, which schematically shows positions of time domain symbols occupied by PSFCH, PSCCH, and PSSCH in one slot. In one slot, the last symbol is used as GP, the last-but-one symbol is used for PSFCH transmission, the data on the last-but-two symbol is the same as the data of the PSFCH symbol and used as AGC, and the last-but-three symbol is also used as GP, the first symbol in the slot is used as AGC, and the data on this symbol is the same as the data on the second time domain symbol in the slot. The PSCCH occupies 3 time domain symbols, and the remaining symbols can be used for PSSCH transmission.

Figure 13:
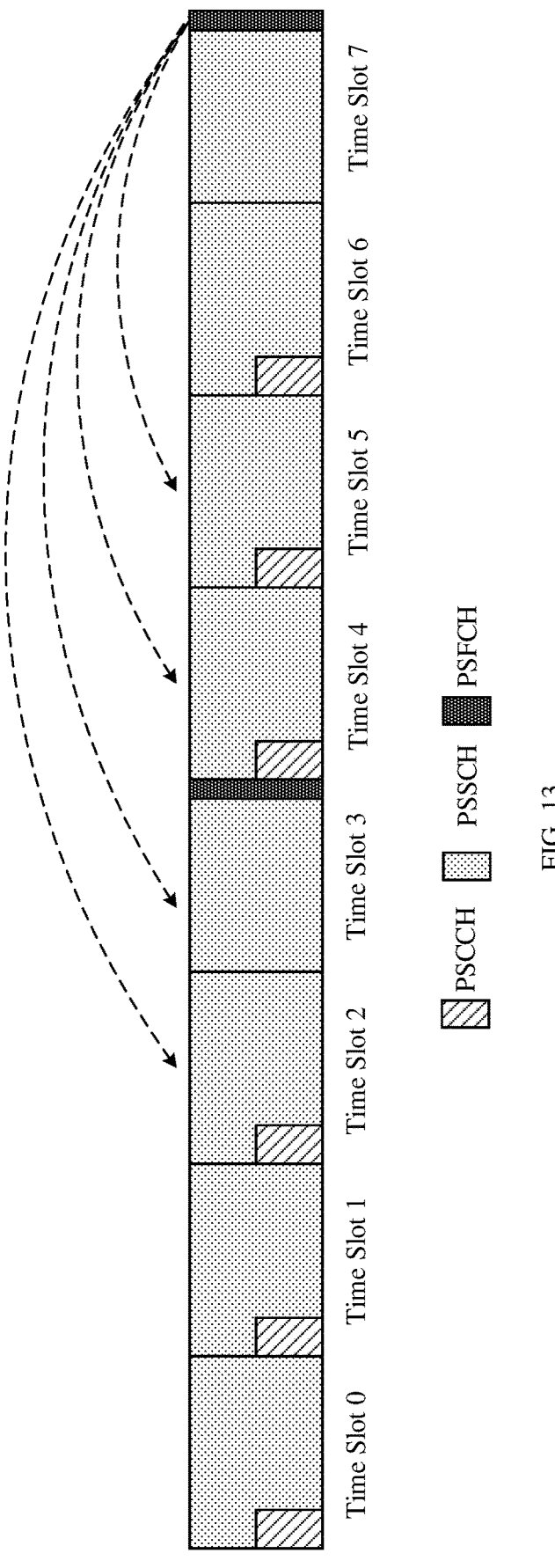
FIG. 13 is a schematic diagram showing an example of a PSFCH transmission with a PSFCH period of 4 slots.

In order to reduce the overhead of PSFCH, one slot in every N slots is defined to include a PSFCH transmission resource, that is, the cycle of sidelink feedback resources is N slots, where N=1, 2, 4, etc. The parameter N is preconfigured or configured by the network. FIG. 13 is a schematic diagram showing a PSFCH with N=4. Here, the minimum slot interval between the slot where the PSFCH is located and the slot where the associated PSSCH is located is 2, and therefore the feedback information of the PSSCH(s) transmitted in slots 2, 3, 4, and 5 is all transmitted in slot 7. The slot {2, 3, 4, 5} can be regarded as a slot set, and the PSFCH(s) corresponding to the PSSCH(s) transmitted in the slot set are transmitted in the same slot.

A resource pool is introduced in the sidelink transmission system. The so-called resource pool is a set of transmission resources. Both the transmission resources configured by the network and the transmission resources autonomously selected by the terminal are resources in the resource pool. For example, the resource pool can be pre-configured or configured by the network. The resource pool is further divided into a transmitting resource pool and a receiving resource pool. The transmitting resource pool means that the transmission resources in the resource pool are used to transmit sidelink data; and the receiving resource pool means that the terminal receives sidelink data on the transmission resources in the resource pool.

In some embodiments, the transmitting terminal transmits the PSCCH/PSSCH in the transmitting resource pool configured for it. The receiving terminal detects whether there is any PSCCH/PSSCH transmitted by other terminals in the receiving resource pool configured for it, and once detected, the receiving terminal determines the transmission resource for transmitting the PSFCH according to the transmission resources of the PSCCH/PSSCH and the configuration information of the PSFCH in the receiving resource pool. After the transmitting terminal transmits the PSCCH/PSSCH, it determines the resource for receiving the PSFCH according to the PSFCH configuration information in the transmitting resource pool, and performs PSFCH detection. In some cases, in order to allow the transmitting terminal and the receiving terminal to perform data transmission properly, the transmitting resource pool configured for the transmitting terminal is usually the same as the receiving resource pool configured for the receiving terminal, such that the transmitting terminal and the receiving terminal can determine the same PSFCH transmission resource according to the PSSCH transmission resource and the PSFCH configuration information in the respective resource pools.

In order to improve the throughput of sidelink transmission, multi-carrier transmission can be supported on the sidelink. The data of the terminal can be transmitted on one or more carriers, and there is a problem of transmission carrier selection. For example, the terminal can select the carrier with the lowest Channel Busy Ratio (CBR) for data transmission according to the CBR of each carrier. The CBR measurement result can reflect the channel occupancy status. The lower the CBR, the lower the system resource occupancy and the more the available resources. The higher the CBR, the higher the system resource occupancy and the more congested the system will be, and the transmission conflict and interference are prone to occur.

If sidelink multi-carrier transmission is introduced in sidelink transmission, a terminal transmits PSCCH(s)/PSSCH(s) on the plurality of carriers, and if each PSCCH/PSSCH needs sidelink feedback, then a receiving terminal needs to transmit sidelink feedback information for the PSCCH(s)/PSSCH(s), the sidelink feedback information can be carried in one PSFCH, or carried in multiple PSFCHs respectively (that is, each PSFCH carries the sidelink feedback information of the corresponding PSSCH). If the sidelink feedback information corresponding to the PSCCH/

PSSCH transmitted on each carrier is carried in the corresponding PSFCH, and the PSFCH is also transmitted on the carrier where the PSCCH/PSSCH is located, then the sidelink feedback mechanism on a single carrier can be used, as shown in (a) in FIG. 14; but if the sidelink feedback information corresponding to the PSCCH(s)/PSSCH(s) transmitted the respective carriers is carried in one PSFCH, or carried different PSFCHs that are transmitted on one carrier, as shown in (b) in FIG. 14, in this case, how to determine the target transmission resource of the PSFCH(s) is a problem to be solved.

FIG. 15 is a schematic interaction diagram illustrating a Physical Sidelink Feedback Channel (PSFCH) transmission method 200 according to an embodiment of the present disclosure. As shown in FIG. 15, the method 200 includes at least part of the following content.

At S210, a second terminal transmits Physical Sidelink Shared Channel(s) (PSSCH(s)) on a plurality of carriers.

Correspondingly, a first terminal receives the PSSCH(s) transmitted by the second terminal on the plurality of carriers.

As an example, the plurality of carriers may include all carriers for sidelink transmission. For example, the sidelink transmission system supports 4 sidelink carriers, and the plurality of carriers may include the 4 carriers.

As another example, the plurality of carriers may include carriers available for sidelink transmission by the first terminal, e.g., sidelink carriers used by the first terminal for sidelink transmission and/or reception.

As yet another example, the plurality of carriers may include carriers available for sidelink transmission by the second terminal, e.g., sidelink carriers used by the second terminal for sidelink transmission and/or reception.

As yet another example, the plurality of carriers may include carriers on which the first terminal receives the PSSCH(s) transmitted by the second terminal. For example, the sidelink transmission system is configured with 4 carriers, the first terminal and the second terminal determine to use 3 carriers for sidelink transmission, but the first terminal only receives the PSSCH(s) from the second terminal on Carrier 1 and Carrier 2. In this case, the plurality of carriers may include two carriers, Carrier 1 and Carrier 2.

As yet another example, the plurality of carriers may include carriers used by the first terminal and the second terminal for sidelink communication. For example, the sidelink transmission system is configured with 4 carriers, the first terminal and the second terminal determine to use 3 carriers for sidelink transmission, but the first terminal only receives the PSSCH(s) from the second terminal on Carrier 1 and Carrier 2. In this case, the plurality of carriers may include 3 carriers determined by the first terminal and the second terminal for sidelink transmission.

That is, the second terminal may use all or part of the sidelink carriers supported by the sidelink system to perform multi-carrier transmission.

Optionally, in an embodiment of the present disclosure, the second terminal may transmit the PSSCH(s) on the plurality of carriers in a unicast mode, or may transmit the PSSCH(s) on the plurality of carriers in a multicast mode or a broadcast mode, and the present disclosure is not limited to the multi-carrier transmission mode of the second terminal.

Correspondingly, the first terminal may be a target receiving terminal of the PSSCH(s) transmitted by the second terminal on the plurality of carriers in the unicast mode, or the first terminal may be one of receiving terminals of the PSSCH(s) transmitted by the second terminal on the plurality of carriers in the multicast mode or the broadcast mode.

It should be understood that, in an embodiment of the present disclosure, if the first terminal is the only receiving terminal of the multi-carrier transmission of the second terminal, the first terminal may determine the target transmission resource of the sidelink feedback channel corresponding to the multi-carrier transmission according to the method described in the embodiment of the present disclosure. Alternatively, if the first terminal is one of the receiving terminals of the multi-carrier transmission of the second terminal, any of the receiving terminals of the multi-carrier transmission of the second terminal may determine the target transmission resource of the sidelink feedback channel corresponding to the multi-carrier transmission according to the method described in the embodiment of the present disclosure, and further perform sidelink feedback according to the target transmission resource.

At S212, the first terminal determines to transmit the first PSFCH to the second terminal on a first carrier.

Correspondingly, S222, the second terminal determines that the first terminal transmits the first PSFCH to the second terminal on the first carrier.

It should be understood that the embodiment of the present disclosure is not limited to any order in which the first terminal and the second terminal determine the target carrier for transmitting the first PSFCH.

In some embodiments, the first PSFCH includes feedback information for a first PSSCH, and the first PSSCH includes at least one PSSCH transmitted on at least one of the plurality of carriers.

As an example, the first PSFCH may include sidelink feedback information for all PSSCH(s) received on the plurality of carriers, that is, the sidelink feedback information for the PSSCH(s) transmitted on the plurality of carriers is carried in one PSFCH. In this case, the first PSSCH may include all PSSCH(s) transmitted on the plurality of carriers.

As another example, the first PSFCH may include sidelink feedback information of one PSSCH transmitted on one of the plurality of carriers. For example, the sidelink feedback information of the PSSCH transmitted on each of the plurality of carriers is carried in one corresponding PSFCH. In this case, the first PSSCH may include one PSSCH transmitted on one of the plurality of carriers.

As another example, the first PSFCH may include sidelink feedback information of the PSSCH(s) transmitted on one of the plurality of carriers. For example, the sidelink feedback information of the PSSCH(s) transmitted on each of the plurality of carriers is carried in one PSFCH. In this case, the first PSSCH may include all PSSCH(s) transmitted on one of the plurality of carriers.

In some embodiments of the present disclosure, the sidelink feedback information of the PSSCH(s) transmitted on the plurality of carriers is all transmitted on one carrier. For example, the sidelink feedback information of the PSSCH(s) transmitted on the plurality of carriers is carried in one PSFCH on the one carrier, or carried in the corresponding PSFCH on the one carrier.

In some embodiments of the present disclosure, the first terminal and the second terminal may determine a target carrier for transmitting the first PSFCH according to a predetermined rule. For example, the first terminal may determine the target carrier for transmitting the first PSFCH according to the predetermined rule, and further transmit the first PSFCH on the target carrier. Correspondingly, the second terminal may also determine the target carrier used by the first terminal for transmitting the first PSFCH according to the predetermined rule, and further receives the first PSFCH on the target carrier. That is, the first terminal and the second terminal have the same understanding of the target carrier used for transmitting the sidelink feedback channel.

The following describes how the first terminal and the second terminal determine the target carrier for transmitting the first PSFCH with reference to specific examples, but the embodiment of the present disclosure is not limited thereto, as long as the transmitting terminal and the receiving terminal of the PSFCH select the carrier according to the same rule.

In some embodiments, the first terminal and the second terminal may determine the target carrier, i.e., the first carrier, for transmitting the first PSFCH according to a CBR. For example, the first carrier may be the carrier with the lowest CBR.

In some other embodiments, the first terminal and the second terminal may determine a target carrier for transmitting the first PSFCH from the plurality of carriers.

As an example, the first carrier may be the carrier with the smallest carrier index or the carrier with the largest carrier index among the plurality of carriers.

As yet another example, the first carrier may be the carrier with the smallest subcarrier spacing or the carrier with the largest subcarrier spacing among the plurality of carriers.

Further, as shown in FIG. 15, the method 200 may further include:

At S213, the first terminal determines a target transmission resource for transmitting the first PSFCH on the first carrier.

Correspondingly, at S223, the second terminal determines a target transmission resource used by the first terminal for transmitting the first PSFCH on the first carrier.

At S230, the first terminal transmits the first PSFCH on the target transmission resource on the first carrier.

Correspondingly, the second terminal receives the first PSFCH on the target transmission resource on the first carrier.

It should be noted that the embodiment of the present disclosure is not limited to the order in which the first terminal and the second terminal determine the target transmission resources for transmitting the first PSFCH.

In some embodiments of the present disclosure, the first terminal and the second terminal may determine the target transmission resource for transmitting the first PSFCH on the target carrier according to a predetermined rule. That is, the first terminal and the second terminal have the same understanding of the target transmission resource used for the sidelink feedback channel.

For example, the first terminal may determine the target transmission resource for transmitting the first PSFCH on the target carrier according to the predetermined rule, and further transmit the first PSFCH on the target transmission resource on the target carrier.

Correspondingly, the second terminal may also determine the target transmission resource used by the first terminal for transmitting the first PSFCH on the target carrier according to the predetermined rule, and further receive the first PSFCH on the target transmission resource on the target carrier.

In the following, the method for the first terminal and the second terminal to determine the target transmission resource for transmitting the first PSFCH on the target carrier will be described with reference to specific embodiments, but the embodiment of the present disclosure is not limited thereto, as long as the transmitting terminal and the receiving terminal of the PSFCH perform resource selection according to the same rule.

It should be noted that, in the following, the first terminal determining the target transmission resource for the first PSFCH will be described as an example, and the second terminal determines the target transmission resource for the first PSFCH in the same way as the first terminal determines the target transmission resource of the first PSFCH. For specific implementation, reference can be made to the relevant implementation of determining the target transmission resource of the first PSFCH by the first terminal. For the sake of brevity, details will be omitted here.

Embodiment 1

In a sidelink system that supports multi-carrier transmission, the subcarrier spacing of the carrier used for a PSSCH transmission and the subcarrier spacing of the carrier used for a PSFCH transmission corresponding to the PSSCH transmission may be different. That is, the slot size on the carrier corresponding to the data channel and the slot size on the carrier corresponding to the feedback channel may be different. Therefore, how to calculate a target slot for PSFCH transmission is a problem that needs to be solved.

In some embodiments of the present disclosure, S213 may include:

The first terminal determines a target slot for transmitting the first PSFCH according to a first subcarrier spacing.

It should be understood that the embodiment of the present disclosure is not limited to any specific implementation of the first subcarrier spacing, as long as the transmitter and the receiver of the PSFCH have the same understanding of the first subcarrier spacing.

In some embodiments, the first subcarrier spacing may be one of:

a subcarrier spacing of the first carrier;

a subcarrier spacing of a carrier where the first PSSCH is located;

a smallest subcarrier spacing among the plurality of carriers;

a largest subcarrier spacing among the plurality of carriers; or a subcarrier spacing determined according to configuration information, wherein the configuration information is pre-configuration information or network configuration information.

For example, the pre-configuration information may be used to configure the receiving terminal of the PSSCH to determine the target slot of the PSFCH according to the subcarrier spacing of the carrier where the first PSSCH is located, or determine the target slot of the PSFCH according to the subcarrier spacing of the carrier where the PSFCH is located, or determine the target slot of the PSFCH according to the smallest subcarrier spacing among the plurality of carriers, or determine the target slot of the PSFCH according to the largest subcarrier spacing among the plurality of carriers.

For example, the network configuration information may be used to configure determining the target slot of the PSFCH according to the subcarrier spacing of the carrier where the first PSSCH is located, or determining the target slot of the PSFCH according to the subcarrier spacing of the carrier where the PSFCH is located, or determining the target slot of the PSFCH according to the smallest subcarrier spacing among the plurality of carriers, or determining the target slot of the PSFCH according to the largest subcarrier spacing among the plurality of carriers.

In some embodiments, the pre-configuration information may be agreed in a protocol, or in other words, predefined. For example, the scheme of determining the subcarrier spacing as agreed in the protocol may be pre-stored on the terminal device, such that when determining the target slot for transmitting the PSFCH, the terminal device can determine the target subcarrier spacing according to the stored scheme of determining the subcarrier spacing, and further determine the target slot for transmitting the PSFCH based on the target subcarrier spacing.

In some embodiments, the network configuration information may include at least one of a System Information Block (SIB), a Radio Resource Control (RRC) message, or Downlink Control Information (DCI).

Embodiment 1-1: The first terminal may determine the target slot for transmitting the first PSFCH according to a slot interval K_offset and the first subcarrier spacing.

In some embodiments of the present disclosure, the slot interval may be indicated by the second terminal.

For example, the second terminal may transmit first indication information to the first terminal, the first indication information indicating the slot interval.

In some embodiments, the first indication information may be carried in at least one of SCI, PC5-RRC signaling, or Media Access Control Control Element (MAC CE).

In some embodiments, the first indication information may be transmitted to the first terminal together with the first PSSCH. That is, while performing the multi-carrier transmission, the second terminal can indicate to the receiving device of the multi-carrier transmission the slot interval K_offset for determining the target slot of the sidelink feedback channel of the multi-carrier transmission.

In some embodiments, the second terminal may transmit third indication information to the first terminal, the third indication information indicating the first subcarrier spacing.

In some embodiments, while performing the multi-carrier transmission, the second terminal can indicate to the receiving device of the multi-carrier transmission the first slot used for determining the target slot of the sidelink feedback channel of the multi-carrier transmission.

That is, the third indication information may be transmitted to the first terminal together with the multi-carrier transmission. For example, the third indication information may be transmitted to the first terminal together with the first PSSCH.

In other embodiments of the present disclosure, the slot interval may be determined according to pre-configuration information or network configuration information.

In some embodiments, the first terminal may determine the slot interval K_offset according to at least one of an SIB, an RRC message or DCI. That is, the network device can configure the slot interval K_offset via the SIB, RRC message or DCI.

In some embodiments, the pre-configuration information may be agreed in a protocol, or in other words, predefined. For example, the slot interval K_offset agreed in the protocol may be pre-stored on the terminal device, such that when determining the target slot for transmitting the PSFCH, the terminal device can determine the target slot according to the stored slot interval K_offset.

It should be understood that the embodiment of the present disclosure is not limited to any configuration granularity of the slot interval K_offset.

As an example, the slot interval K_offset may have the granularity of carrier. For example, each carrier may correspond to a corresponding slot interval K_offset, or all carriers may correspond to the same slot interval K_offset.

As another example, the slot interval may include a first slot interval and a second slot interval. The first slot interval is used for the scenario where the PSSCH and the PSFCH associated with the PSSCH use the same carrier, and the second slot interval is used for the scenario where the PSSCH and the PSFCH associated with the PSSCH uses different carriers.

As another example, the slot interval may have the granularity of per PSSCH carrier and per PSFCH. For example, the carrier where the PSSCH is transmitted and the carrier where the PSFCH is transmitted have a correspondence with the slot interval. Therefore, the corresponding slot interval can be determined according to the carrier where the PSSCH is located and the carrier where the PSFCH is located based on the correspondence.

Table 1 is an example of a correspondence between the carrier where the PSSCH is located, the carrier where the PSFCH is located and the slot interval K_offset.

TABLE 1

| | | Carrier where PSFCH is located | | |
| Slot Interval K_offset | | Carrier 0 | Carrier 1 | Carrier 2 |
| --- | --- | --- | --- | --- |
| Carrier where | Carrier 0 | 2 | 3 | 4 |
| PSSCH is located | Carrier 1 | 3 | 2 | 3 |
| | Carrier 2 | 4 | 3 | 2 |

For example, if the carrier where the PSSCH is located is Carrier 1 and the carrier where the PSFCH is located is Carrier 0, then the slot interval K_offset may be determined to be 3 slots.

In some embodiments of the present disclosure, the first terminal may determine the target slot for transmitting the first PSFCH according to the slot for transmitting the first PSSCH, the slot size corresponding to the first subcarrier spacing, and the slot interval.

For example, the first PSSCH includes the PSSCH transmitted on slot n on a second carrier, the slot interval is K_offset slots, and the first terminal determines the first slot including a PSFCH transmission resource after slot n+K_offset as the target slot for transmitting the first PSFCH on the first carrier, where the size of each slot in the K_offset slots is determined according to the first subcarrier spacing.

It should be understood that in the embodiment of the present disclosure, the target slot is a target slot on the first carrier. When determining the target slot according to the slot for transmitting the first PSSCH, the slot for transmitting the first PSSCH may be mapped to a corresponding slot on the first carrier first according to the subcarrier spacing of the carrier where the first PSSCH is located and the first subcarrier spacing, and then the target slot may be determined according to the corresponding slot and the slot interval, or a first slot may be determined according to the slot for transmitting the first PSSCH and the slot interval first, then the first slot may be mapped to a corresponding slot on the first carrier, and further the target slot may be determined according to the corresponding slot of the first slot on the first carrier. The present disclosure is not limited to any of these examples.

Hereinafter, the scheme of determining the target slot will be described in conjunction with two implementations of the first subcarrier spacing.

Implementation 1: The first subcarrier spacing is the subcarrier spacing of the carrier where the first PSFCH is located.

Example 1: As shown in FIG. 16, the first terminal receives the first PSSCH transmitted by the second terminal at slot 2 on Carrier 0, and determines that the first PSFCH corresponding to the first PSSCH is transmitted on Carrier 1. The subcarrier spacing of Carrier 0 is 15 kHz, and the subcarrier spacing of Carrier 2 is 30 kHz. PSFCH transmission resources are configured on each carrier, and the slot interval K_offset corresponding to each carrier is 2 slots.

For Example 1, the first terminal may determine the target slot according to the subcarrier spacing of Carrier 1.

For example, the first terminal first determines the slot on Carrier 1 corresponding to the slot for transmitting the first PSSCH. Slot 2 on Carrier 0 corresponds to slot 1 on Carrier 1. Then the first terminal can determine the target slot of the first PSFCH according to slot 1 on Carrier 1 and the slot interval, where the size of each slot in the K_offset slots is determined according to the slot size on Carrier 1. For example, the first terminal may determine that the target slot may be the first available slot after slot 3 on Carrier 1, where the available slot may refer to a slot including a PSFCH transmission resource. Assuming that slot 3 on Carrier 1 includes a PSFCH transmission resource, the first terminal may determine slot 3 on Carrier 1 as the target slot for transmitting the first PSFCH.

Example 2: As shown in FIG. 16, the first terminal receives the first PSSCH transmitted by the second terminal at slot 1 on Carrier 1, and determines that the first PSFCH corresponding to the first PSSCH is transmitted on Carrier 0. The subcarrier spacing of Carrier 0 is 15 kHz, and the subcarrier spacing of Carrier 2 is 30 kHz. PSFCH transmission resources are configured on each carrier, and the slot interval K_offset corresponding to each carrier is 2 slots.

For Example 2, the first terminal may determine the target slot according to the subcarrier spacing of Carrier 0.

For example, the first terminal first determines the slot on Carrier 0 corresponding to the slot for transmitting the first PSSCH on Carrier 1. Slot 1 on Carrier 1 corresponds to slot 2 and slot 3 on Carrier 0. In this case, as an example, the first terminal may determine the corresponding slot on Carrier 0 according to the end position of slot 1 on Carrier 1. That is, the slot on Carrier 0 corresponding to slot 1 on Carrier 1 can be determined as the last one of at least one slot corresponding to Carrier 1 and Carrier 0, that is, slot 3 on Carrier 1.

Further, the target slot of the first PSFCH can be determined according to slot 3 on Carrier 0 and K_offset slots, where the size of each slot in the K_offset slots is determined according to the slot size on Carrier 0. When K_offset is 2, the target slot may be the first available slot after slot 5 on Carrier 0, where the available slot may refer to a slot including a PSFCH transmission resource. Assuming that slot 5 on Carrier 0 includes a PSFCH transmission resource, the first terminal may determine slot 5 on Carrier 0 as the target slot for transmitting the first PSFCH.

Implementation 2: The first subcarrier spacing is the subcarrier spacing of the carrier where the first PSSCH is located.

Example 1: As shown in FIG. 16, the first terminal receives the first PSSCH transmitted by the second terminal at slot 2 on Carrier 0, and determines that the first PSFCH corresponding to the first PSSCH is transmitted on Carrier 1. The subcarrier spacing of Carrier 0 is 15 kHz, and the subcarrier spacing of Carrier 2 is 30 kHz. PSFCH transmission resources are configured on each carrier, and the slot interval K_offset corresponding to each carrier is 2 slots.

For Example 1, the first terminal may determine the target slot according to the subcarrier spacing of Carrier 0.

For example, the first terminal may determine the target slot for transmitting the first PSFCH according to slot 2 of Carrier 0 and the slot interval of K_offset slots (the slot size is the slot size on Carrier 0). When K_offset is 2, the first terminal may determine the first available slot after slot 4 on Carrier 0 as the target slot for transmitting the first PSFCH.

In some implementations, the first available slot after slot 4 on Carrier 0 can be determined as follows.

First, slot 4 on Carrier 0 is mapped to a corresponding slot on Carrier 1. As shown in FIG. 16, slot 4 on Carrier 0 corresponds to slot 2 on Carrier 1. Then the first available slot after slot 2 on Carrier 1 can be determined is the target slot. Assuming that slot 3 on Carrier 1 includes a PSFCH transmission resource, slot 3 on Carrier 1 can be determined as the target slot of the first PSFCH.

Example 2: The first terminal receives the first PSSCH at slot 1 on Carrier 1, and determines that the first PSFCH corresponding to the first PSSCH is transmitted on Carrier 0. The subcarrier spacing of Carrier 0 is 15 kHz, and the subcarrier spacing of Carrier 2 is 30 kHz. PSFCH transmission resources are configured on each carrier, and the slot interval K_offset corresponding to each carrier is 2 slots.

For Example 2, the first terminal may determine the target slot according to the subcarrier spacing of carrier 1.

For example, the first terminal may determine the target slot for transmitting the first PSFCH according to slot 1 of Carrier 1 and the slot interval of K_offset slots (the slot size is the slot size on Carrier 1). When K_offset is 2, the first terminal may determine the first available slot after slot 3 on Carrier 1 as the target slot for transmitting the first PSFCH.

In some implementations, the first available slot after slot 3 on Carrier 1 can be determined as follows.

First, slot 3 on Carrier 1 is mapped to a corresponding slot on Carrier 0. As shown in FIG. 16, slot 3 on Carrier 1 corresponds to slot 6 and slot 7 on Carrier 0. In some implementations, the first available slot after slot 7 on Carrier 0 is determined as the target slot. Assuming that slot 7 on Carrier 0 includes a PSFCH transmission resource, slot 7 on Carrier 0 can be determined as the target slot of the first PSFCH.

Optionally, in some embodiments, K_offset can be determined according to the processing time required for sidelink data on the plurality of carriers. For example, K_offset can be 1, 2 or 3, etc. Optionally, if the sidelink data on the plurality of carriers requires longer processing time, K_offset can be a larger value, such as 4, 6, 8 or 16, etc.

EXAMPLE 1-2

The first terminal determines the target slot for transmitting the first PSFCH according to the first subcarrier spacing and a minimum slot interval K between the PSSCH and the PSFCH.

Optionally, the minimum time interval between the PSSCH and the PSFCH may be preconfigured or configured by a network device.

In some embodiments, the first terminal determines the target slot for transmitting the first PSFCH according to the slot where the first PSSCH is located, the slot size according to the first subcarrier spacing, and the minimum slot interval K.

As an example, the first PSSCH includes a PSSCH transmitted on slot n on a second carrier, the minimum slot interval is K slots, where K is a positive integer, and the size of each slot in the K slots is determined according to the first subcarrier spacing. The first terminal determines the first slot including a PSFCH transmission resource after slot n+K as the target slot for transmitting the first PSFCH.

It should be understood that in the embodiment of the application, the first slot including a PSFCH transmission resource after slot n+K may include the following implementations.

Implementation 1: The first slot including a PSFCH transmission resource after slot n+K is included, i.e., the first slot including a PSFCH transmission resource after the start position of slot n+K.

Implementation 2: The first slot including a PSFCH transmission resource after slot n+K is not included, i.e., the first slot including a PSFCH transmission resource after the end position of slot n+K.

It should be understood that the above two implementations are also applicable to the first slot including a PSFCH transmission resource after slot n+K_offset in Embodiment 1-1.

That is, the first slot including a PSFCH transmission resource after slot n+K_offset may include the following implementations.

Implementation 1: The first slot including a PSFCH transmission resource after slot n+K_offset is included, i.e., the first slot including a PSFCH transmission resource after the start position of slot n+K_offset.

Implementation 2: The first slot including a PSFCH transmission resource after slot n+K_offset is not included, i.e., the first slot including a PSFCH transmission resource after the end position of slot n+K_offset.

Optionally, in some embodiments, the above Implementation 1 is applicable to the case where the format corresponding to the PSFCH includes 2 OFDM symbols, and the above Implementation 2 is applicable to the case where the format corresponding to the PSFCH includes more than 2 OFDM symbols.

In some embodiments of the present disclosure, the minimum slot interval K may be determined according to the terminal processing time. For example, the terminal processing time may include the time when the terminal receives the PSSCH and prepares for sidelink feedback.

In some embodiments, the interpretation of the start position of the minimum slot interval K can be dependent on the PSFCH format.

For example, for PSFCH format 0 as shown in (a) in FIG. 17 (each PSFCH occupies 2 OFDM symbols), the minimum slot interval K=1 slot is configured. If the terminal detects a PSSCH in slot 2 (that is, n=2), an earlier part of slot 3 can be used as the processing time of the terminal, and the terminal can further transmit a PSFCH on the PSFCH transmission resource in slot 3. Thus, the terminal can determine that the slot for transmitting PSFCH is a slot including a PSFCH transmission resource after n+K, and in this case slot n+K may include slot n+K itself.

For example, for PSFCH format 1 shown in (b) in FIG. 17 (each PSFCH occupies all available sidelink transmission symbols in a slot), the minimum slot interval K=1 slot is configured, if the terminal detects a PSSCH in slot 2 (that is, n=2), then the terminal needs to perform PSSCH detection in slot 3 and prepare time for sidelink feedback. Therefore, the terminal cannot transmit a PSFCH in slot 3, and the terminal will transmit the PSFCH in the first slot including a PSFCH transmission resource (for example, slot 5) after slot 3. Therefore, the terminal determines that the slot for transmitting the PSFCH is the slot including the PSFCH transmission resource after slot n+K, and in this case slot n+K may not include slot n+K itself.

Optionally, in some embodiments, the minimum slot interval K may be determined according to the processing time required for sidelink data on the plurality of carriers. For example, K may be 1, 2 or 3, etc. Optionally, if the sidelink data on the plurality of carriers requires longer processing time, K can be a larger value, such as 4, 6, 8 or 16, etc.

It should be understood that the embodiment of the present disclosure is not limited to any configuration granularity of the minimum slot interval K.

As an example, the minimum slot interval K may have the granularity of carrier. For example, each carrier may correspond to a corresponding minimum slot interval K, or all carriers may correspond to the same minimum slot interval K.

As another example, the minimum slot interval may include a first minimum slot interval K1 and a second minimum slot interval K2. The first minimum slot interval K1 indicates the minimum slot interval when the PSFCH and the PSSCH associated with the PSFCH are transmitted on the same carrier, and the second minimum slot interval K2 indicates the minimum slot interval when the PSFCH and the PSSCH associated with the PSFCH are transmitted on different carriers.

As another example, the minimum slot interval may have the granularity of per PSSCH carrier and per PSFCH. For example, the carrier where the PSSCH is transmitted and the carrier where the PSFCH is transmitted may have a first correspondence with the minimum slot interval. Therefore, the corresponding minimum slot interval may be determined according to the carrier where the PSSCH is located and the carrier where the PSFCH is located based on the first correspondence.

Optionally, the first correspondence may be configured by a network device, or configured by the second terminal, or predefined.

Table 2 is an example of the correspondence between the carrier where the PSSCH is located, the carrier where the PSFCH is located and the minimum slot interval K.

TABLE 2

| Minimum Slot Interval K | | Carrier where PSFCH is located | | |
| --- | --- | --- | --- | --- |
| | | Carrier 0 | Carrier 1 | Carrier 2 |
| Carrier where PSSCH is located | Carrier 0 | 2 | 3 | 4 |
| | Carrier 1 | 3 | 2 | 3 |
| | Carrier 2 | 4 | 3 | 2 |

For example, if the carrier where the PSSCH is located is Carrier 1 and the carrier where the PSFCH is located is Carrier 0, then the minimum time interval may be determined to be 3 slots.

It should be understood that in the embodiment of the present disclosure, the target slot is a target slot on the first carrier. When determining the target slot according to the slot for transmitting the first PSSCH, the slot for transmitting the first PSSCH may be mapped to a corresponding slot on the first carrier first according to the subcarrier spacing of the carrier where the first PSSCH is located and the first subcarrier spacing, and then the target slot may be determined according to the corresponding slot and the minimum slot interval, or a second slot may be determined according to the slot for transmitting the first PSSCH and the minimum slot interval first, then the second slot may be mapped to a corresponding slot on the first carrier, and further the target slot may be determined according to the corresponding slot of the second slot on the first carrier. The present disclosure is not limited to any of these examples.

Hereinafter, the scheme of determining the target slot will be described in conjunction with two implementations of the first subcarrier spacing.

Implementation 1: The first subcarrier spacing is the subcarrier spacing of the carrier where the first PSFCH is located.

Example 1: As shown in FIG. 16, the first terminal receives the first PSSCH transmitted by the second terminal at slot 2 on Carrier 0, and determines that the first PSFCH corresponding to the first PSSCH is transmitted on Carrier 1. The subcarrier spacing of Carrier 0 is 15 kHz, and the subcarrier spacing of Carrier 2 is 30 kHz. PSFCH transmission resources are configured on each carrier, and the minimum slot interval K is 2 slots.

For Example 1, the first terminal may determine the target slot according to the subcarrier spacing of Carrier 1.

For example, the first terminal first determines the slot on Carrier 1 corresponding to the slot for transmitting the first PSSCH. Slot 2 on Carrier 0 corresponds to slot 1 on Carrier 1. Then the first terminal can determine the target slot of the first PSFCH according to slot 1 on Carrier 1 and the minimum slot interval of K slots, where the size of each slot in the K slots is determined according to the slot size on Carrier 1. For example, the first terminal may determine that the target slot may be the first available slot after slot 3 on Carrier 1, where the available slot may refer to a slot including a PSFCH transmission resource. Assuming that slot 3 on Carrier 1 includes a PSFCH transmission resource, the first terminal may determine slot 3 on Carrier 1 as the target slot for transmitting the first PSFCH.

Example 2: As shown in FIG. 16, the first terminal receives the first PSSCH transmitted by the second terminal at slot 1 on Carrier 1, and determines that the first PSFCH corresponding to the first PSSCH is transmitted on Carrier 0. The subcarrier spacing of Carrier 0 is 15 kHz, and the subcarrier spacing of Carrier 2 is 30 kHz. PSFCH transmission resources are configured on each carrier, and the minimum slot interval K is 2 slots.

For Example 2, the first terminal may determine the target slot according to the subcarrier spacing of Carrier 0.

For example, the first terminal first determines the slot on Carrier 0 corresponding to the slot for transmitting the first PSSCH on Carrier 1. Slot 1 on Carrier 1 corresponds to slot 2 and slot 3 on Carrier 0. In this case, as an example, the first terminal may determine the corresponding slot on Carrier 0 according to the end position of slot 1 on Carrier 1. That is, the slot on Carrier 0 corresponding to slot 1 on Carrier 1 can be determined as the last one of at least one slot corresponding to Carrier 1 and Carrier 0, that is, slot 3 on Carrier 1.

Further, the target slot of the first PSFCH can be determined according to slot 3 on Carrier 0 and minimum slot interval (2 slots), where the size of each slot in the 2 slots is determined according to the slot size on Carrier 0. For example, the target slot may be the first available slot after slot 5 on Carrier 0, where the available slot may refer to a slot including a PSFCH transmission resource. Assuming that slot 5 on Carrier 0 includes a PSFCH transmission resource, the first terminal may determine slot 5 on Carrier 0 as the target slot for transmitting the first PSFCH.

Implementation 2: The first subcarrier spacing is the subcarrier spacing of the carrier where the first PSSCH is located.

Example 1: As shown in FIG. 16, the first terminal receives the first PSSCH transmitted by the second terminal at slot 2 on Carrier 0, and determines that the first PSFCH corresponding to the first PSSCH is transmitted on Carrier 1. The subcarrier spacing of Carrier 0 is 15 kHz, and the subcarrier spacing of Carrier 2 is 30 kHz. PSFCH transmission resources are configured on each carrier, and the minimum slot interval K is 2 slots.

For Example 1, the first terminal may determine the target slot according to the subcarrier spacing of Carrier 0.

For example, the first terminal may determine the target slot for transmitting the first PSFCH according to slot 2 of Carrier 0 and the minimum slot interval (i.e., 2 slots, where the slot size is the slot size on Carrier 0). For example, the first terminal may determine the first available slot after slot 4 on Carrier 0 as the target slot for transmitting the first PSFCH.

In some implementations, the first available slot after slot 4 on Carrier 0 can be determined as follows.

First, slot 4 on Carrier 0 is mapped to a corresponding slot on Carrier 1. As shown in FIG. 16, slot 4 on Carrier 0 corresponds to slot 2 on Carrier 1. Then the first available slot after slot 2 on Carrier 1 can be determined is the target slot. Assuming that slot 3 on Carrier 1 includes a PSFCH transmission resource, slot 3 on Carrier 1 can be determined as the target slot of the first PSFCH.

Example 2: The first terminal receives the first PSSCH at slot 1 on Carrier 1, and determines that the first PSFCH corresponding to the first PSSCH is transmitted on Carrier 0. The subcarrier spacing of Carrier 0 is 15 kHz, and the subcarrier spacing of Carrier 2 is 30 kHz. PSFCH transmission resources are configured on each carrier, and the minimum slot interval K is 2 slots.

For Example 2, the first terminal may determine the target slot according to the subcarrier spacing of carrier 1.

For example, the first terminal may determine the target slot for transmitting the first PSFCH according to slot 1 of Carrier 1 and the minimum slot interval (2 slots, where the slot size is the slot size on Carrier 1). For example, the first terminal may determine the first available slot after slot 3 on Carrier 1 as the target slot for transmitting the first PSFCH.

Optionally, the first available slot after slot 3 on Carrier 1 can be determined as follows.

First, slot 3 on Carrier 1 is mapped to a corresponding slot on Carrier 0. As shown in FIG. 16, slot 3 on Carrier 1 corresponds to slot 6 and slot 7 on Carrier 0, and the first available slot after slot 7 on Carrier 0 is determined as the target slot. Assuming that slot 7 on Carrier 0 includes a PSFCH transmission resource, slot 7 on Carrier 0 can be determined as the target slot of the first PSFCH.

To summarize, Embodiment 1 can be described as determining the target slot for transmitting the first PSFCH according to the slot for transmitting the first PSSCH and the slot interval K_offset or the minimum time interval K, where the slot size corresponding to K_offset or K can be determined according to the first subcarrier spacing.

It should be understood that in Embodiment 1, the first terminal may first map the slot for transmitting the first PSSCH to the corresponding slot on the target carrier for transmitting the first PSFCH, and then apply slot offset of K_offset or K slots, to determine the target slot for transmitting the first PSFCH. Alternatively, the slot for transmitting the first PSSCH can be subjected to a slot offset of K_offset or K slots first, and then mapped to the corresponding slot on the target carrier, and then the target slot for transmitting the first PSFCH can be determined. The present disclosure is not limited to any of these examples.

Embodiment 2

In some embodiments of the present disclosure, PSSCH (s) transmitted on different carriers may correspond to different PSFCH transmission resources, which is beneficial to avoiding interference between the PSFCH transmissions corresponding to the PSSCH(s) on different carriers. For example, for PSSCH(s) transmitted on different carriers, different carrier indexes may be used to determine corresponding PSFCH transmission resources.

In some embodiments of the present disclosure, the first terminal may determine the target transmission resource for transmitting the first PSFCH on the first carrier according to a carrier index.

It should be understood that the carrier index may be any carrier indexing scheme understood consistently by the first terminal and the second terminal, and the present disclosure is not limited to this.

Optionally, in some embodiments, the second terminal may transmit fourth indication information to the first terminal, the fourth indication information indicating the carrier index.

For example, while performing multi-carrier transmission, the second terminal may indicate to the receiving device of the multi-carrier transmission the carrier index used for determining the target transmission resource of the sidelink feedback channel of the multi-carrier transmission.

That is, the fourth indication information may be transmitted to the first terminal together with the multi-carrier transmission. For example, the fourth indication information may be transmitted to the first terminal together with the first PSSCH.

In some embodiments, the fourth indication information may be carried by at least one of SCI, PC5-RRC signaling or MAC CE.

That is, the second terminal may indicate the resource index to the first terminal via SCI, PC5-RRC or MAC CE.

Optionally, in some embodiments, the carrier index according to which the first terminal and the second terminal determine the target transmission resource may be determined according to pre-configuration information or network configuration information.

For example, the network configuration information may be used to configure determining the target transmission resource of the PSFCH according to the carrier index of the carrier where the PSSCH is located, or determining the target transmission resource of the PSFCH according to the carrier index of the carrier where the PSFCH is located, or determining the target transmission resource of the PSFCH according to the carrier index of the carrier where the PSSCH is located and the carrier index of the carrier where the PSFCH is located.

In some embodiments, the pre-configuration information may be agreed in a protocol, or in other words, predefined. For example, the pre-configuration information may be used to configure determining the target transmission resource of PSFCH according to the carrier index of the carrier where the PSSCH is located, or determining the target transmission resource of PSFCH according to the carrier index of the carrier where the PSFCH is located, or determining the target transmission resource of the PSFCH according to the carrier index of the carrier where the PSSCH is located and the carrier index of the carrier where the PSFCH is located.

In some implementations, the scheme of determining the target transmission resource of the PSFCH as agreed in the protocol may be pre-stored on the terminal device, such that when determining the target transmission resource of the PSFCH, the terminal device can use the stored scheme of determining the target transmission resource of the PSFCH to determine the target transmission resource, and further transmit the PSFCH on the target transmission resource.

In some embodiments, the first terminal may determine the target transmission resource for transmitting the first PSFCH on the first carrier according to the carrier index of the carrier where the first PSSCH is located and/or the carrier index of the carrier where the first PSFCH is located.

Embodiment 2-1: The first terminal determines the target transmission resource for transmitting the first PSFCH on the first carrier according to the carrier index of the carrier where the first PSSCH is located or the carrier index of the carrier where the first PSFCH is located.

In this way, for PSSCH(s) transmitted on different carriers, the corresponding PSFCH transmission resources can be determined according to different carrier indexes, such that different PSFCH transmission resources can be determined, which is beneficial to avoiding interference between the PSFCH transmissions corresponding to the PSSCH(s) on different carriers.

As an example, the target transmission resource for transmitting the first PSFCH on the first carrier may be determined according to the following Equation (1):

$$(P_{ID} + M_{ID} + C_{ID}) \bmod R_{PRB,CS}^{PSFCH} \qquad \text{Equation (1)}$$

where $P_{ID}$ represents a source identifier, $M_{ID}$ represents a destination identifier, $C_{ID}$ represents the carrier index of the carrier where the first PSSCH is located or the carrier index of the carrier where the first PSFCH is located, $$R_{PRB,CS}^{PSFCH}$$

represents a transmission resource set available for transmitting the first PSFCH, and mod represents modulo.

For example, as shown in FIG. 16, two carriers are configured for the first terminal, and a PSFCH transmission resource is configured on each carrier, the minimum time interval between the PSFCH and its associated PSSCH is 2 slots, and the cycle of the PSFCH is 2 slots. The first terminal receives the first PSSCH transmitted by the second terminal in slot 2 of Carrier 0, and the first terminal determines that the first PSFCH corresponding to the first PSSCH is to be transmitted on Carrier 0, then the first terminal determines to transmit in slot 5 on Carrier 0 according to the minimum time interval between the PSFCH and the PSSCH. The first terminal receives a second PSSCH transmitted by the second terminal in slot 3 of Carrier 1, and the first terminal determines that a second PSFCH corresponding to the second PSSCH is also to be transmitted on Carrier 0, and determines to transmit in slot 5 on Carrier 0 according to the minimum time interval between the PSFCH and the PSSCH. If the frequency-domain start positions of the PSSCH(s) transmitted by the second terminal on the two carriers are the same, the determined PSFCH transmission resource sets $$R_{PRB,CS}^{PSFCH}$$

are also the same. For example, if $$R_{PRB,CS}^{PSFCH}$$

includes 10 transmission resources, their indexes are 0-9. The source identifier $P_{ID}$ corresponding to the second terminal is 0, and the identifier of the first terminal is also 0. If $C_{ID}$ in Equation (1) represents the carrier index of the carrier where the PSSCH is located, then the transmission resource of the first PSFCH corresponding to the first PSSCH as transmitted on Carrier 0 (corresponding $C_{ID}$=0) determined according to Equation (1) is Resource 0, and the transmission resource of the second PSFCH corresponding to the second PSSCH as transmitted on Carrier 1 (corresponding $C_{ID}$=1) determined according to Equation (1) is Resource 1. Therefore, the PSSCH(s) on the two carriers correspond to different PSFCH transmission resources.

Embodiment 2-2: The first terminal determines the target transmission resource for transmitting the first PSFCH on the first carrier according to a difference between the carrier index of the carrier where the first PSSCH is located and the carrier index of the carrier where the first PSFCH is located.

As an example, the first terminal may determine the target transmission resource for transmitting the first PSFCH on the first carrier according to the following Equation (2):

$$(P_{ID} + M_{ID} + C_{ID\_diff}) \bmod R_{PRB,CS}^{PSFCH} \qquad \text{Equation (2)}$$

where $P_{ID}$ represents a source identifier, $M_{ID}$ represents a destination identifier, $C_{ID\_diff}$ represents the difference between the carrier index of the carrier where the first PSSCH is located and the carrier index of the carrier where the first PSFCH is located, $$R_{PRB,CS}^{PSFCH}$$

represents a transmission resource set available for transmitting the first PSFCH, and mod represents modulo.

Optionally, $C_{ID\_diff}$ is the carrier index of the carrier where the first PSSCH is located minus the carrier index of the carrier where the first PSFCH is located, or the carrier index of the carrier where the first PSFCH is located minus the carrier index of the carrier where the first PSSCH is located. In this way, when the PSSCH and PSFCH are transmitted on the same carrier, since their carriers are the same, $C_{ID\_diff}$=0, such that Equation (2) can be compatible with the scheme of determining the transmission resource of the PSFCH on one single carrier.

In some embodiments, the difference of $C_{ID\_diff}$ may be a negative value, and thus the result of the Equation (2) may be a negative value. In order to make the calculated PSFCH transmission resource a positive value, Equation (2) may be modified.

For example, the target transmission resource for transmitting the first PSFCH on the first carrier may be determined according to the following Equation (3):

$$(P_{ID} + M_{ID} + C_{ID\_diff} + N * R_{PRB,CS}^{PSFCH}) \bmod R_{PRB,CS}^{PSFCH} \qquad \text{Equation (3)}$$

where $P_{ID}$ represents a source identifier, $M_{ID}$ represents a destination identifier, $C_{ID\_diff}$ represents the difference between the carrier index of the carrier where the first PSSCH is located and the carrier index of the carrier where the first PSFCH is located, $$R_{PRB,CS}^{PSFCH}$$

represents a transmission resource set available for transmitting the first PSFCH, mod represents modulo, and N is an integer.

Here, the value of N may be any integer which makes the value of Equation (3) a positive value.

For example, as shown in FIG. 16, two carriers are configured for the first terminal, and a PSFCH transmission resource is configured on each carrier, the minimum time interval between the PSFCH and its associated PSSCH is 2 slots, and the cycle of the PSFCH is 2 slots. The first terminal receives the first PSSCH transmitted by the second terminal in slot 2 of Carrier 0, and the first terminal determines that the first PSFCH corresponding to the first PSSCH is to be transmitted on Carrier 0, then the first terminal determines to transmit in slot 5 on Carrier 0 according to the minimum time interval between the PSFCH and the PSSCH. The first terminal receives a second PSSCH transmitted by the second terminal in slot 3 of Carrier 1, and the first terminal determines that a second PSFCH corresponding to the second PSSCH is also to be transmitted on Carrier 0, and determines to transmit in slot 5 on Carrier 0 according to the minimum time interval between the PSFCH and the PSSCH. If the frequency-domain start positions of the PSSCH(s) transmitted by the second terminal on the two carriers are the same, the determined PSFCH transmission resource sets $$R_{PRB,CS}^{PSFCH}$$

are also the same. For example, if $$R_{PRB,CS}^{PSFCH}$$

includes 10 transmission resources, their indexes are 0-9. The source identifier $P_{ID}$ corresponding to the second terminal is 0, and the identifier of the first terminal is also 0. If $C_{ID\_diff}=C_{ID_{PSSCH}}-C_{ID_{PSFCH}}$, then the transmission resource of the first PSFCH corresponding to the first PSSCH as transmitted on Carrier 0 determined according to Equation (3) is Resource 0 (corresponding $C_{ID\_diff}=0$, N=0), and the transmission resource of the second PSFCH corresponding to the second PSSCH as transmitted on Carrier 1 determined according to Equation (3) is Resource 1 (corresponding $C_{ID\_diff}=1$, N=0). That is, the PSSCH(s) transmitted on the two carriers correspond to different PSFCH transmission resources on Carrier 0.

In another example, as shown in FIG. 16, two carriers are configured for the first terminal, and a PSFCH transmission resource is configured on each carrier, the minimum time interval between the PSFCH and its associated PSSCH is 2 slots, and the cycle of the PSFCH is 2 slots. The first terminal receives the first PSSCH transmitted by the second terminal in slot 2 of Carrier 0, and the first terminal determines that the first PSFCH corresponding to the first PSSCH is to be transmitted on Carrier 1, then the first terminal determines to transmit in slot 5 according to the minimum time interval between the PSFCH and the PSSCH. The first terminal receives a second PSSCH transmitted by the second terminal in slot 3 of Carrier 1, and the first terminal determines that a second PSFCH corresponding to the second PSSCH is also to be transmitted on Carrier 1, and determines to transmit in slot 5 according to the minimum time interval between the PSFCH and the PSSCH. If the frequency-domain start positions of the PSSCH(s) transmitted by the second terminal on the two carriers are the same, the determined PSFCH transmission resource sets $$R_{PRB,CS}^{PSFCH}$$

are also the same. For example, if $$R_{PRB,CS}^{PSFCH}$$

includes 10 transmission resources, their indexes are 0-9. The source identifier $P_{ID}$ corresponding to the second terminal is 0, and the identifier of the first terminal is also 0. If $C_{ID\_diff}=C_{ID_{PSSCH}}-C_{ID_{PSFCH}}$, then the transmission resource of the first PSFCH corresponding to the first PSSCH as transmitted on Carrier 0 determined according to Equation (3) is Resource 9 (corresponding $C_{ID\_diff}=-1$, N=1), and the transmission resource of the second PSFCH corresponding to the second PSSCH as transmitted on Carrier 1 determined according to Equation (3) is Resource 1 (corresponding $C_{ID\_diff}=0$, N=0). That is, the PSSCH(s) transmitted on the two carriers correspond to different PSFCH transmission resources on Carrier 1.

To summarize, the first terminal may determine the target transmission resource of the first PSFCH according to the following Equation (4):

$$\left(P_{ID} + M_{ID} + f\left(C_{ID_{PSSCH}}, C_{ID_{PSFCH}}\right) + N * \right. \hspace{2em} \text{Equation (4)}$$
$$\left. R_{PRB,CS}^{PSFCH}\right) \mod R_{PRB,CS}^{PSFCH}$$

where $f(C_{ID_{PSSCH}}, C_{ID_{PSFCH}})$ may include a function composed of $C_{ID_{PSSCH}}, C_{ID_{PSFCH}}$, or optionally $f(C_{ID_{PSSCH}}, C_{ID_{PSFCH}})$ may only include one variable in $C_{ID_{PSSCH}}, C_{ID_{PSFCH}}$, and N is an integer.

Embodiment 2-2: the first terminal determines the target transmission resource for transmitting the first PSFCH on the first carrier according to a resource index.

In some embodiments of the present disclosure, the resource index may be indicated by the second terminal.

For example, the second terminal may transmit second indication information to the first terminal, the second indication information indicating the resource index.

In some embodiments, the second indication information may be carried in at least one of SCI, PC5-RRC signaling or MAC CE.

That is, the second terminal may indicate the resource index to the first terminal via SCI, PC5-RRC or MAC CE.

In some embodiments, the second indication information may be transmitted to the first terminal together with the first PSSCH. That is, while performing multi-carrier transmission, the second terminal can indicate to the receiving device of the multi-carrier transmission the resource index used for determining the target transmission resource of the sidelink feedback channel of the multi-carrier transmission.

In other embodiments of the present disclosure, the resource index may be determined according to pre-configuration information or network configuration information.

In some embodiments, the first terminal may determine the resource index according to at least one of SIB, RRC message or DCI. That is, the network device can configure the resource index via the SIB, RRC message or DCI.

As an example, the target transmission resource for transmitting the first PSFCH on the first carrier may be determined according to the following Equation (5):

$$I_{index2} = (P_{ID} + M_{ID} + I_{index1}) \bmod R_{PRB,CS}^{PSFCH} \qquad \text{(Equation 5)}$$

As yet another example, the target transmission resource for transmitting the first PSFCH on the first carrier may be determined according to the following Equation (6):

$$I_{index2} = I_{index1} \bmod R_{PRB,CS}^{PSFCH} \qquad \text{(Equation 6)}$$

As another example, the target transmission resource for transmitting the first PSFCH on the first carrier may be determined according to the following Equation (7):

$$I_{index2} = I_{index1} \qquad \text{Equation (7)}$$

where $P_{ID}$ represents a source identifier, $M_{ID}$ represents a destination identifier, $I_{index1}$ represents the resource index indicated by the second indication information, $I_{index2}$ represents a resource index of the target transmission resource, $$R_{PRB,CS}^{PSFCH}$$

represents a transmission resource set available for transmitting the first PSFCH, and mod represents modulo.

Optionally, in some embodiments, the resource index indicated by the second indication information may be a resource index calculated by the second terminal according to one of the above Equations (2) to (4).

Embodiment 3: the first terminal divides a first transmission resource set for PSFCH transmission according to the plurality of carriers, to obtain a transmission resource set corresponding to each of the plurality of carriers, and determines the target transmission resource for transmitting the first PSFCH in the transmission resource set corresponding to the first carrier.

As an example, the first transmission resource set may be divided according to a plurality of carriers configured by a system. If the system configures four carriers, the first transmission resource set may be divided into four groups corresponding to the four sidelink carriers, respectively.

As another example, the first transmission resource set may be divided according to carriers used for multi-carrier transmission. For example, if the system configures four carriers and the second terminal uses two of the carriers for multi-carrier transmission, then the first transmission resource set may be divided into two groups corresponding to the two carriers, respectively.

As another example, the first transmission resource set may be divided according to sidelink carriers used by the first terminal for sidelink transmission, or the first transmission resource set may be divided according to sidelink carriers used by the second terminal for sidelink transmission.

As yet another example, the first transmission resource set may be divided according to carriers used by the first terminal and the second terminal for sidelink communication. For example, if the system configures 4 carriers, and the first terminal and the second terminal determine to use two of the carriers for multi-carrier transmission when establishing a connection, for example, indicating to perform sidelink transmission on Carrier 0 and Carrier 1 via PC5-RRC signaling, the first transmission resource set may be divided into two groups corresponding to the two carriers, respectively. It should be understood that the first transmission resource set may include any transmission resources used for transmitting the PSFCH, for example, frequency domain resources, code domain resources, time domain resources, etc., and the present disclosure is not limited to this.

By dividing the resource set used for PSFCH transmission according to carriers, different resources can be used for transmission of PSSCH(s) on different carriers, which is beneficial to avoiding the interference between multiple PSFCHs transmitted on the same carrier.

Embodiment 3-1: The first transmission resource set includes a first PRB set available for PSFCH transmission in one PSFCH slot.

In this case, the operation of dividing the first transmission resource set for PSFCH transmission according to the plurality of carriers, to obtain the transmission resource set corresponding to each of the plurality of carriers may include:

Dividing the first PRB set available for PSFCH transmission in one PSFCH slot according to the plurality of carriers, to obtain a second PRB set available for PSFCH transmission corresponding to each of the plurality of carriers.

Further, the first terminal may determine the target transmission resource for transmitting the first PSFCH in the second PRB set corresponding to the first carrier.

Optionally, the one PSFCH slot may refer to a slot available for PSFCH transmission.

As an example, the first terminal may determine the second PRB set available for PSFCH transmission corresponding to each carrier according to Equation (8):

$$M_{PRB,set,c}^{PSFCH} = \text{floor}\left(M_{PRB,set}^{PSFCH}/\text{N\_c}\right) \qquad \text{Equation (8)}$$

where $$M_{PRB,set}^{PSFCH}$$

represents the first PRB set available for PSFCH transmission in one PSFCH slot, $$M_{PRB,set,c}^{PSFCH}$$

represents the second PRB set available for PSFCH transmission corresponding to carrier c in one PSFCH slot, c=0,1,2, . . . , N_c−1, N_c represents a number of carriers included in the plurality of carriers, and floor represents rounding down.

Optionally, in an embodiment of the present disclosure, if $$M_{PRB,set}^{PSFCH}$$

can be divisible by N_c, the number of PRBs corresponding to each carrier is $$\text{floor}\left(M_{PRB,set}^{PSFCH} / \text{N\_c}\right),$$

or otherwise N_c−1) carriers in the N_c carriers correspond to $$\text{floor}\left(M_{PRB,set}^{PSFCH} / \text{N\_c}\right)$$

PRBs, and the other carrier corresponds to $$M_{PRB,set}^{PSFCH} - \text{floor}\left(M_{PRB,set}^{PSFCH} / \text{N\_c}\right) * (\text{N\_c} - 1)$$

PRBs.

As an example, the first terminal may determine the second PRB set available for PSFCH transmission corresponding to each carrier according to Equation (9):

$$M_{PRB,set,c}^{PSFCH} = \text{ceil}\left(M_{PRB,set}^{PSFCH} / \text{N\_c}\right) \qquad \text{Equation (9)}$$

where $$M_{PRB,set}^{PSFCH}$$

represents the first PRB set available for PSFCH transmission in one PSFCH slot, $$M_{PRB,set,c}^{PSFCH}$$

represents the second PRB set available for PSFCH transmission corresponding to carrier c in one PSFCH slot, c=0,1,2, . . . , N_c−1, N_c represents a number of carriers included in the plurality of carriers, and ceil represents rounding up.

Optionally, in an embodiment of the present disclosure, if $$M_{PRB,set}^{PSFCH}$$

can be divisible by N_c, the number of PRBs corresponding to each carrier is $$\text{ciel}\left(M_{PRB,set}^{PSFCH} / \text{N\_c}\right),$$

or otherwise (N_c−1) carriers in the N_c carriers correspond to $$\text{ciel}\left(M_{PRB,set}^{PSFCH} / \text{N\_c}\right)$$

PRBs, and the other carrier corresponds to $$M_{PRB,set}^{PSFCH} - \text{floor}\left(M_{PRB,set}^{PSFCH} / \text{N\_c}\right) * (\text{N\_c} - 1)$$

PRBs.

Optionally, in an embodiment of the present disclosure, $$M_{PRB,set}^{PSFCH}$$

may be determined according to the parameter sidelink PSFCH resource block set (sl-PSFCH-RB-Set).

For example, $$M_{PRB,set}^{PSFCH} = 10, \text{N\_c} = 4,$$

when Equation (8) is used to calculate the second PRB set, $$M_{PRB,set,c}^{PSFCH} = 2,$$

4 carriers correspond to 8 PRBs in total, and the remaining 2 PRBs do not belong to any carrier, or in order to improve resource utilization, the remaining 2 PRBs correspond to the carrier with the smallest index among the 4 carriers, or the remaining 2 PRBs correspond to the two carriers with the smallest indexes among the 4 carriers, respectively, or the remaining 2 PRBs correspond to the carrier with the largest index among the 4 carriers, or the remaining 2 PRBs correspond to one of the two carriers with the largest indexes among the 4 carriers, respectively.

In another example, $$M_{PRB,set}^{PSFCH} = 10,$$

N_c=4, when Equation (9) is used to calculate the second PRB set, $$M_{PRB,set,c}^{PSFCH} = 3,$$

for example, each of the first 3 carriers corresponds to 3 PRBs, and the last carrier corresponds to 1 PRB.

It should be understood that the embodiment of the present disclosure is not limited to any the specific dividing scheme.

As shown in FIG. 18, the system configures 4 sidelink carriers, and $$M_{PRB,set}^{PSFCH}$$

includes 20 PRBs for PSFCH transmission. For example, the 20 PRBs can be divided according to the 4 carriers, and the second PRB set corresponding to each carrier includes 5 PRBs.

In some implementations, as shown in FIG. 18, the PRB set {0, 4, 8, 12, 16} is the second PRB set corresponding to Carrier 0, used for the PSFCH corresponding to the PSSCH transmission on Carrier 0, and the PRB set {1, 5, 9, 13, 17} is the second PRB set corresponding to Carrier 1, used for the PSFCH corresponding to the PSSCH transmission on Carrier 1, and so on.

In other implementations, the PRB set {0, 1, 2, 3, 4} may be used as the second PRB set corresponding to Carrier 0, used for the PSFCH corresponding to the PSSCH transmission on Carrier 0, and the PRB set {5, 6, 7, 8, 9 } may be used as the second PRB set corresponding to Carrier used for the PSFCH corresponding to the PSSCH transmission on Carrier 1, and so on.

Embodiment 3-2: The first transmission resource set includes a third PRB set available for PSFCH transmission corresponding to a PSSCH of one subchannel and one slot.

In this case, the operation of dividing the first transmission resource set for PSFCH transmission according to the plurality of carriers, to obtain the transmission resource set corresponding to each of the plurality of carriers includes:

Dividing the third PRB set available for PSFCH transmission corresponding to the PSSCH of the one subchannel and the one slot according to the plurality of carriers, to obtain a fourth PRB set available for PSFCH transmission corresponding to the PSSCH of the one subchannel and the one slot corresponding to each of the plurality of carriers.

Further, the first terminal may determine the target transmission resource for transmitting the first PSFCH in the fourth PRB set corresponding to the first carrier.

As an example, the first terminal may determine the fourth PRB set available for PSFCH transmission corresponding to the PSSCH of the one subchannel and the one slot corresponding to each carrier according to the following Equation (10):

$$M_{subch,slot,c}^{PSFCH} = \mathrm{floor}\left(M_{subch,slot}^{PSFCH}/\mathrm{N\_c}\right) \qquad \text{Equation (10)}$$

where $$M_{subch,slot}^{PSFCH}$$

represents the third PRB set available for PSFCH transmission corresponding to the PSSCH of the one subchannel and the one slot, $$M_{subch,slot,c}^{PSFCH}$$

represents the fourth PRB set available for PSFCH transmission corresponding to the PSSCH of the one subchannel and the one slot corresponding to carrier c, c=0,1,2, . . . , N_c−1, and N_c represents a number of carriers included in the plurality of carriers, and floor represents rounding down.

Optionally, in an embodiment of the present disclosure, if $$M_{subch,slot}^{PSFCH}$$

can be divisible by N_c, the number of PRBs included in the fourth PRB set corresponding to each carrier is $$\mathrm{floor}\left(M_{subch,slot}^{PSFCH}/\mathrm{N\_c}\right),$$

or otherwise (N_c−1) carriers in N_c carriers correspond to $$\mathrm{floor}\left(M_{subch,slot}^{PSFCH}/\mathrm{N\_c}\right)$$

PRBs, and the other carrier corresponds to $$M_{PRB,set}^{PSFCH} - \mathrm{floor}\left(M_{PRB,set}^{PSFCH}/\mathrm{N\_c}\right)*(\mathrm{N\_c}-1)$$

PRBs.

As another example, the first terminal may determine the fourth PRB set available for PSFCH transmission corresponding to the PSSCH of the one subchannel and the one slot corresponding to each carrier according to the following Equation (11):

$$M_{subch,slot,c}^{PSFCH} = \mathrm{ceil}\left(M_{subch,slot}^{PSFCH}/\mathrm{N\_c}\right) \qquad \text{Equation (11)}$$

where $$M_{subch,slot}^{PSFCH}$$

represents the third PRB set available for PSFCH transmission corresponding to the PSSCH of the one subchannel and the one slot, $$M_{subch,slot,c}^{PSFCH}$$

represents the fourth PRB set available for PSFCH transmission corresponding to the PSSCH of the one subchannel and the one slot corresponding to carrier c, c=0,1,2, . . . , N_c−1, and N_c represents a number of carriers included in the plurality of carriers, and ceil represents rounding up.

Optionally, in an embodiment of the present disclosure, if $$M_{subch,slot}^{PSFCH}$$

can be divisible by N_c, the number of PRBs included in the fourth PRB set corresponding to each carrier is $$\mathrm{ceil}\left(M_{subch,slot}^{PSFCH}/\mathrm{N\_c}\right),$$

or otherwise (N_c−1) carriers in N_c carriers correspond to $$\mathrm{ceil}\left(M_{subch,slot}^{PSFCH}/\mathrm{N\_c}\right)$$

PRBs, and the other carrier corresponds to $$M_{PRB,set}^{PSFCH} - \text{floor}\left(M_{PRB,set}^{PSFCH}\big/ N\_c\right) * (N\_c - 1)$$

PRBs.

In some embodiments, $$M_{subch,slot}^{PSFCH}$$

may be determined according to the following Equation:

$$M_{subch,slot}^{PSFCH} = M_{PRB,set}^{PSFCH} \big/ \left(N_{subch} \cdot N_{PSSCH}^{PSFCH}\right),$$

where $$M_{PRB,set}^{PSFCH}$$

represents a number of PRBs available for PSFCH transmission in one PSFCH slot;

$N_{subch}$ represents a number of subchannels included in a resource pool of a carrier where a PSFCH is located, or a number of subchannels included in a resource pool of a carrier where a PSSCH is located;

$$N_{PSSCH}^{PSFCH}$$

represents a number of PSSCH slots associated with the PSFCH slot in the resource pool of the carrier where the PSFCH is located, or a number of PSSCH slots associated with the PSFCH slot in the resource pool of the carrier where the PSSCH is located.

Here, the PSSCH slot may refer to a slot available for PSSCH transmission.

To summarize, the fourth PRB set corresponding to the PSSCH transmitted on slot i and subchannel j on carrier c and the PSFCH transmitted on the target carrier of the PSFCH can be:

$$\left[\left(i + j \cdot N_{PSSCH}^{PSFCH}\right) \cdot M_{subch,slot,c}^{PSFCH}, \left(i + 1 + j \cdot N_{PSSCH}^{PSFCH}\right) \cdot M_{subch,slot,c}^{PSFCH} - 1\right],$$

$$\text{where } 0 \le i < N_{PSSCH}^{PSFCH}, 0 \le j < N_{subch}, \text{ and } M_{subch,slot,c}^{PSFCH}$$

can be determined according to Equation (10) or Equation (11).

Embodiment 3-3: The first transmission resource set includes a resource set available for transmitting the first PSFCH.

In this case, the operation of dividing the first transmission resource set for PSFCH transmission according to the plurality of carriers, to obtain the transmission resource set corresponding to each of the plurality of carriers may include:

Dividing the resource set available for transmitting the first PSFCH according to the plurality of carriers, to obtain a resource set available for transmitting the first PSFCH corresponding to each of the plurality of carriers.

Further, the first terminal may determine the target transmission resource for transmitting the first PSFCH in the resource set available for transmitting the first PSFCH corresponding to the first carrier.

As an example, the first terminal may determine the resource set available for transmitting the first PSFCH corresponding to each carrier according to the following Equation (12):

$$R_{PRB,CS,c}^{PSFCH} = \text{floor}\left(R_{PRB,cs}^{PSFCH}\big/ N\_c\right) \qquad \text{Equation (12)}$$

where $$R_{PRB,CS,c}^{PSFCH}$$

represents a resource set available for transmitting the first PSFCH corresponding to carrier c, $$R_{PRB,CS}^{PSFCH}$$

represents the resource set available for transmitting the first PSFCH, c=0,1,2, . . . , N_c−1, N_c represents a number of carriers included in the plurality of carriers, and floor represents rounding down.

As another example, the first terminal may determine the resource set available for transmitting the first PSFCH corresponding to each carrier according to the following Equation (13):

$$R_{PRB,CS,s}^{PSFCH} = \text{ceil}\left(R_{PRB,CS}^{PSFCH}\big/ N\_c\right) \qquad \text{Equation (13)}$$

where $$R_{PRB,CS,c}^{PSFCH}$$

represents a resource set available for transmitting the first PSFCH corresponding to carrier c, $$R_{PRB,CS}^{PSFCH}$$

represents the resource set available for transmitting the first PSFCH, c=0,1,2, . . . , N_c−1, N_c represents a number of carriers included in the plurality of carriers, and ceil represents rounding up.

In some embodiments, $$R_{PRB,CS}^{PSFCH}$$

may be determined according to the following Equation:

$$R_{PRB,CS}^{PSFCH} = N_{type}^{PSFCH} \cdot M_{subch,slot}^{PSFCH} \cdot N_{CS}^{PSFCH}$$

where $$N_{CS}^{PSFCH}$$

represents a number of Cyclic Shift (CS) pairs, $$M_{subch,slot}^{PSFCH}$$

represents the PRB set available for PSFCH transmission corresponding to a PSSCH of one subchannel and one slot, and $$N_{type}^{PSFCH}$$

is 1 or $$N_{subch}^{PSSCH},$$

where $$N_{subch}^{PSSCH}$$

represents a number of subchannels occupied by the PSSCH.

In some embodiments, $$N_{CS}^{PSFCH}$$

may be determined according to the parameter number of sidelink multiplexing cyclic shift pairs (sl-NumMuxCS-Pair).

Optionally, in the $$R_{PRB,CS}^{PSFCH}$$

resource set, the PSFCH transmission resource set corresponding to the PSSCH transmitted on carrier c is $$[[c \cdot R_{PRB,CS,c}^{PSFCH}, (c+1) \cdot R_{PRB,CS,c}^{PSFCH}]],$$

where c=0,1, . . . , N_c−1 represents the carrier index, or resource $$c + k \cdot R_{PRB,CS,c}^{PSFCH},$$

k=0,1,2, . . . ,. Therefore, the PSSCH(s) on different carriers correspond to different transmission resources in the PSFCH transmission resource set, avoiding PSFCH transmission interference between the plurality of carriers.

To summarize, the transmitting terminal and the receiving terminal of the multi-carrier transmission can determine the target transmission resource for transmitting the sidelink feedback channel corresponding to the multi-carrier transmission in a consistent manner, e.g., by determining the target slot for transmitting the sidelink feedback channel on the target carrier according to the method described in Embodiment 1, or determining the target transmission resource of the sidelink feedback channel on the target carrier according to the method described in Embodiment 2 or Embodiment 3.

It should be understood that in an embodiment of the present disclosure, the scheme in which the first terminal and the second terminal determine the target slot may be indicated by the second terminal, or determined according to pre-configuration information or network configuration information.

For example, the second terminal may indicate to the first terminal that the target slot is to be determined according to the first subcarrier spacing.

In another example, the network configuration information may configure the first terminal or the second terminal to determine the target slot according to the first subcarrier spacing.

In another example, the pre-configuration information may configure the first terminal or the second terminal to determine the target slot according to the first subcarrier spacing.

It should be understood that, in an embodiment of the present disclosure, the scheme in which the first terminal and the second terminal determine the target transmission resource of the PSFCH may be indicated by the second terminal, or determined based on pre-configuration information or network configuration Information.

For example, the second terminal may indicate to the first terminal that the target transmission resource is to be determined according to the carrier index, or the resource index, or by means of dividing into groups.

In another example, the network configuration information may be configure determining the target transmission resource according to the carrier index, or the resource index, or by means of dividing into groups.

In another example, the pre-configuration information may be configure determining the target transmission resource according to the carrier index, or the resource index, or by means of dividing into groups.

It should be noted that, in an embodiment of the present disclosure, Embodiment 1 to Embodiment 3 can be implemented alone or in combination. For example, the target slot of the PSFCH may be determined according to Embodiment 1, and further the target transmission resource on the target slot may be determined according to Embodiment 2 or Embodiment 3.

It should also be noted that the PSSCH in the embodiment of the present disclosure can also be replaced by a PSCCH. That is, the first terminal can determine the target transmission resource of the PSFCH corresponding to the PSCCH according to any of the above embodiments.

In a single-carrier transmission scenario, if the second terminal transmits a PSSCH or PSCCH on a second carrier, the first terminal and the second terminal can also determine that the target transmission resource of the PSFCH corresponding to the PSSCH or PSCCH transmitted on another carrier according to the method described in any of the embodiments of the present disclosure. That is, the technical solutions of the embodiments of the present disclosure are also applicable to the scenario where data and feedback information are transmitted via different carriers in a single-carrier transmission.

The method embodiments of the present disclosure have been described in detail above with reference to FIGS. 15-18, and the apparatus embodiments of the present disclosure will be described in detail below with reference to FIGS. 19-23. It can be appreciated that the apparatus embodiments and the method embodiments correspond to each other, and for similar descriptions, reference can be made to the method embodiments.

Figure 19:
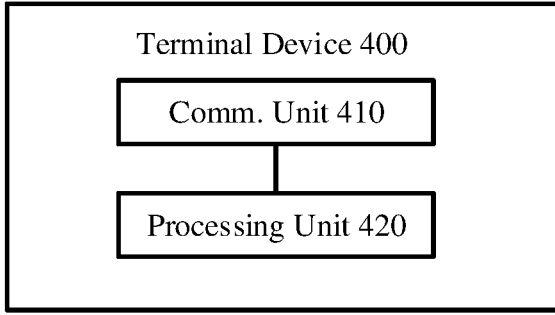
FIG. 19 is a schematic block diagram of a terminal device according to an embodiment of the present disclosure.

FIG. 19 shows a schematic block diagram of a terminal device 400 according to an embodiment of the present disclosure. As shown in FIG. 19, the terminal device 400 includes:

a communication unit 410 configured to receive Physical Sidelink Shared Channel(s) (PSSCH(s)) transmitted by a second terminal on a plurality of carriers; and a processing unit 420 configured to determine to transmit the first PSFCH to the second terminal on a first carrier, the first PSFCH including feedback information for a first PSSCH, and the first PSSCH comprising at least one PSSCH transmitted on at least one of the plurality of carriers and determine a target transmission resource for transmitting the first PSFCH on the first carrier.

The communication unit 410 is further configured to transmit the first PSFCH on the target transmission resource on the first carrier.

In some embodiments of the present disclosure, the plurality of carriers may include:

all carriers for sidelink transmission, carriers available for sidelink transmission by the terminal device, carriers available for sidelink transmission by the second terminal, or carriers on which the terminal device receives the PSSCH (s) transmitted by the second terminal.

In some embodiments of the present disclosure, the processing unit 420 may be further configured to:

determine a target slot for transmitting the first PSFCH according to a first subcarrier spacing.

In some embodiments of the present disclosure, the first subcarrier spacing may be one of:

a subcarrier spacing of the first carrier;

a subcarrier spacing of a carrier where the first PSSCH is located;

a smallest subcarrier spacing among the plurality of carriers;

a largest subcarrier spacing among the plurality of carriers; or a subcarrier spacing determined according to configuration information, wherein the configuration information is pre-configuration information or network configuration information.

In some embodiments of the present disclosure, the processing unit 420 may be further configured to:

obtain first indication information indicating a slot interval; and determine the target slot for transmitting the first PSFCH according to the slot interval and the first subcarrier spacing.

In some embodiments of the present disclosure, the terminal device may obtain the first indication information from the second terminal, and the first indication information may be carried in Sidelink Control Information (SCI), PC5-Radio Resource Control (PC5-RRC) signaling or Medium Access Control Control Element (MAC CE).

In some embodiments of the present disclosure, the terminal device may obtain the first indication information according to pre-configuration information or network configuration information.

In some embodiments of the present disclosure, the network configuration information may include at least one of a System Information Block (SIB), an RRC message, or Downlink Control Information (DCI).

In some embodiments of the present disclosure, the processing unit 420 may be further configured to:

determine the target slot for transmitting the first PSFCH according to the first subcarrier spacing and a minimum slot interval between a PSSCH and a PSFCH.

In some embodiments of the present disclosure, the processing unit 420 may be further configured to:

determine the target slot for transmitting the first PSFCH according to a slot where the first PSSCH is located, a slot size corresponding to the first subcarrier spacing and the minimum slot interval.

In some embodiments of the present disclosure, the first PSSCH may include a PSSCH transmitted on slot n on a second carrier, and the minimum slot interval is K slots, where K is a positive integer, and a slot size of each of the K slots is determined according to the first subcarrier spacing, and the processing unit 420 may be further configured to:

determine the first slot including a PSFCH transmission resource after slot n+K as the target slot for transmitting the first PSFCH.

In some embodiments of the present disclosure, the minimum slot interval may include a first minimum slot interval and a second minimum slot interval, wherein the first minimum slot interval indicates a minimum slot interval between a PSFCH and a PSSCH associated with the PSFCH when transmitted on a same carrier, and the second minimum slot interval indicates a minimum slot interval between a PSFCH and a PSSCH associated with the PSFCH when transmitted on different carriers.

In some embodiments of the present disclosure, the processing unit 420 may be further configured to:

determine a target minimum slot interval according to a carrier where the first PSSCH is located and a carrier where the first PSFCH is located.

In some embodiments of the present disclosure, the processing unit 420 may be further configured to:

determine the target minimum slot interval according to the carrier where the first PSSCH is located, the carrier where the first PSFCH is located, and a first correspondence, the first correspondence being a correspondence between carriers where PSSCH(s) are located, carriers where PSFCH(s) are located, and minimum slot intervals.

In some embodiments of the present disclosure, the processing unit 420 may be further configured to:

determine the target slot for transmitting the first PSFCH according to the first subcarrier spacing and the target minimum slot interval.

In some embodiments of the present disclosure, the processing unit 420 may be further configured to:

determine the target transmission resource for transmitting the first PSFCH on the first carrier according to a carrier index.

In some embodiments of the present disclosure, the processing unit 420 may be further configured to:

determine the target transmission resource for transmitting the first PSFCH on the first carrier according to a carrier index of a carrier where the first PSSCH is located and/or a carrier index of a carrier where the first PSFCH is located.

In some embodiments of the present disclosure, the processing unit 420 may be further configured to:

determining the target transmission resource for transmitting the first PSFCH on the first carrier according to:

$$(P_{ID} + M_{ID} + C_{ID}) \bmod R_{PRB,CS}^{PSFCH}$$

where $P_{ID}$ represents a source identifier, $M_{ID}$ represents a destination identifier, $C_{ID}$ represents the carrier index of the carrier where the first PSSCH is located or the carrier index of the carrier where the first PSFCH is located, $$R_{PRB,CS}^{PSFCH}$$

represents a transmission resource set available for transmitting the first PSFCH, and mod represents modulo.

In some embodiments of the present disclosure, the processing unit 420 may be further configured to:

determine the target transmission resource for transmitting the first PSFCH on the first carrier according to a difference between the carrier index of the carrier where the first PSSCH is located and the carrier index of the carrier where the first PSFCH is located.

In some embodiments of the present disclosure, the processing unit 420 may be further configured to:

determining the target transmission resource for transmitting the first PSFCH on the first carrier according to:

$$(P_{ID} + M_{ID} + C_{ID\_diff}) \bmod R_{PRB,CS}^{PSFCH}$$

where $P_{ID}$ represents a source identifier, $M_{ID}$ represents a destination identifier, $C_{ID\_diff}$ represents the difference between the carrier index of the carrier where the first PSSCH is located and the carrier index of the carrier where the first PSFCH is located, $$R_{PRB,CS}^{PSFCH}$$

represents a transmission resource set available for transmitting the first PSFCH, and mod represents modulo.

In some embodiments of the present disclosure, the processing unit 420 may be further configured to:

determine the target transmission resource for transmitting the first PSFCH on the first carrier according to:

$$\left(P_{ID} + M_{ID} + C_{ID\_diff} + N^* R_{PRB,CS}^{PSFCH}\right) \bmod R_{PRB,CS}^{PSFCH}$$

where $P_{ID}$ represents a source identifier, $M_{ID}$ represents a destination identifier, $C_{ID\_diff}$ represents the difference between the carrier index of the carrier where the first PSSCH is located and the carrier index of the carrier where the first PSFCH is located, $$R_{PRB,CS}^{PSFCH}$$

represents a transmission resource set available for transmitting the first PSFCH, mod represents modulo, and N is an integer.

In some embodiments of the present disclosure, the processing unit 420 may be further configured to:

obtain second indication information including a resource index; and determine the target transmission resource for transmitting the first PSFCH on the first carrier according to the resource index.

In some embodiments of the present disclosure, the processing unit 420 may be further configured to:

determine the target transmission resource for transmitting the first PSFCH on the first carrier according to:

$$I_{index2} = (P_{ID} + M_{ID} + I_{index1}) \bmod R_{PRB,CS}^{PSFCH}; \text{ or}$$

$$I_{index2} = I_{index1} \bmod R_{PRB,CS}^{PSFCH}; \text{ or}$$

$$I_{index2} = I_{index1}$$

where $P_{ID}$ represents a source identifier, $M_{ID}$ represents a destination identifier, $I_{index1}$ represents the resource index indicated by the second indication information, $I_{index2}$ represents a resource index of the target transmission resource, $$R_{PRB,CS}^{PSFCH}$$

represents a transmission resource set available for transmitting the first PSFCH, and mod represents modulo.

In some embodiments of the present disclosure, the second indication information may be obtained from the second terminal, and the second indication information may be carried in SCI, PC5-RRC or MAC CE; or the second indication information may be obtained from pre-configuration information or network configuration information, the network configuration information including at least one of an SIB, an RRC message, or Downlink Control Information (DCI).

In some embodiments of the present disclosure, the processing unit 420 may be further configured to:

divide a first transmission resource set for PSFCH transmission according to the plurality of carriers, to obtain a transmission resource set corresponding to each of the plurality of carriers; and determine the target transmission resource for transmitting the first PSFCH in the transmission resource set corresponding to the first carrier.

In some embodiments of the present disclosure, the first transmission resource set may include a first PRB set available for PSFCH transmission in one PSFCH slot, and the processing unit 420 may be further configured to:

divide the first PRB set available for PSFCH transmission in one PSFCH slot according to the plurality of carriers, to obtain a second PRB set available for PSFCH transmission corresponding to each of the plurality of carriers.

In some embodiments of the present disclosure, the processing unit 420 may be further configured to:

determine the second PRB set available for PSFCH transmission corresponding to each carrier according to:

$$M_{PRB,set,c}^{PSFCH} = \text{floor}\left(M_{PRB,set}^{PSFCH}/\text{N\_c}\right), \text{ or } M_{PRB,set,c}^{PSFCH} = \text{ceil}\left(M_{PRB,set}^{PSFCH}/\text{N\_c}\right)$$

where $$M_{PRB,set}^{PSFCH}$$

represents the first PRB set available for PSFCH transmission in one PSFCH slot, $$M_{PRB,set,c}^{PSFCH}$$

represents the second PRB set available for PSFCH transmission corresponding to carrier c in one PSFCH slot, N_c represents a number of carriers included in the plurality of carriers, and floor represents rounding down and ceil represents rounding up.

In some embodiments of the present disclosure, the first transmission resource set may include a third PRB set available for PSFCH transmission corresponding to a PSSCH of one subchannel and one slot, and the processing unit 420 may be further configured to:

divide the third PRB set available for PSFCH transmission corresponding to the PSSCH of the one subchannel and the one slot according to the plurality of carriers, to obtain a fourth PRB set available for PSFCH transmission corresponding to the PSSCH of the one subchannel and the one slot corresponding to each of the plurality of carriers.

In some embodiments of the present disclosure, the processing unit 420 may be further configured to:

According to the following Equation, determine the fourth PRB set that can be used to transmit the PSFCH corresponding to the PSSCH corresponding to one slot and one subchannel of each carrier:

determine the fourth PRB set available for PSFCH transmission corresponding to the PSSCH of the one subchannel and the one slot corresponding to each carrier according to:

$$M_{subch,slot,c}^{PSFCH} = \text{floor}\left(M_{subch,slot}^{PSFCH}/\text{N\_c}\right) \text{ or } M_{subch,slot,c}^{PSFCH} = \text{ciel}\left(M_{subch,slot}^{PSFCH}/\text{N\_c}\right)$$

where $$M_{subch,slot}^{PSFCH}$$

represents the third PRB set available for PSFCH transmission corresponding to the PSSCH of the one subchannel and the one slot, $$M_{subch,slot,c}^{PSFCH}$$

represents the fourth PRB set available for PSFCH transmission corresponding to the PSSCH of the one subchannel and the one slot corresponding to carrier c, N_c represents a number of carriers included in the plurality of carriers, and floor represents rounding down and ceil represents rounding up.

In some embodiments of the present disclosure, $$M_{subch,slot}^{PSFCH}$$

may be determined according to:

$$M_{subch,slot}^{PSFCH} = M_{PRB,set}^{PSFCH} / \left(N_{subch} \cdot N_{PSSCH}^{PSFCH}\right),$$

where $$M_{PRB,set}^{PSFCH}$$

represents a number of PRBs available for PSFCH transmission in one PSFCH slot;

$N_{subch}$ represents a number of subchannels included in a resource pool of a carrier where a PSFCH is located, or a number of subchannels included in a resource pool of a carrier where a PSSCH is located;

$$N_{PSSCH}^{PSFCH}$$

represents a number of PSSCH slots associated with the PSFCH slot in the resource pool of the carrier where the PSFCH is located, or a number of PSSCH slots associated with the PSFCH slot in the resource pool of the carrier where the PSSCH is located.

In some embodiments of the present disclosure, the first transmission resource set may include a resource set available for transmitting the first PSFCH, and the processing unit 420 may be further configured to:

divide the resource set available for transmitting the first PSFCH according to the plurality of carriers, to obtain a resource set available for transmitting the first PSFCH corresponding to each of the plurality of carriers.

In some embodiments of the present disclosure, the processing unit 420 may be further configured to:

determine the resource set available for transmitting the first PSFCH corresponding to each carrier according to:

$$R_{PRB,CS,c}^{PSFCH} = \text{floor}\left(R_{PRB,CS}^{PSFCH}/\text{N\_c}\right) \text{ or } R_{PRB,CS,c}^{PSFCH} = \text{ciel}\left(R_{PRB,CS}^{PSFCH}/\text{N\_c}\right)$$

where $$R^{PSFCH}_{PRB,CS,c}$$

represents a resource set available for transmitting the first PSFCH corresponding to carrier c, $$R^{PSFCH}_{PRB,CS}$$

represents the resource set available for transmitting the first PSFCH, N_c represents a number of carriers included in the plurality of carriers, and floor represents rounding down and ceil represents rounding up.

In some embodiments of the present disclosure, $$R^{PSFCH}_{PRB,CS}$$

may be determined according to:

$$R^{PSFCH}_{PRB,CS} = N^{PSFCH}_{type} \cdot M^{PSFCH}_{subch,slot} \cdot N^{PSFCH}_{CS}$$

where $$N^{PSFCH}_{CS}$$

represents a number of Cyclic Shift (CS) pairs, $$M^{PSFCH}_{subch,slot}$$

represents the PRB set available for PSFCH transmission corresponding to a PSSCH of one subchannel and one slot, and $$N^{PSFCH}_{type}$$

is 1 or $$N^{PSSCH}_{subch},$$

where $$N^{PSSCH}_{subch}$$

represents a number of subchannels occupied by the PSSCH.

Optionally, in some embodiments, the above communication unit may be a communication interface or a transceiver, or an input/output interface of a communication chip or a system-on-chip. The above processing unit may be one or more processors.

It can be appreciated that the terminal device 400 according to the embodiment of the present disclosure may correspond to the first terminal in the method embodiment of the present disclosure, and the above and other operations and/or functions of the respective units in the terminal device 400 are provided for the purpose of implementing the process flow corresponding to the first terminal in the method 200 shown in FIG. 15, and details thereof will be not omitted here for brevity.

Figure 20:
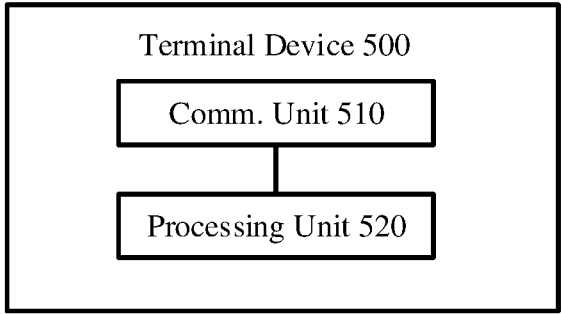
FIG. 20 is a schematic block diagram of another terminal device according to an embodiment of the present disclosure.

FIG. 20 shows a schematic block diagram of another terminal device according to an embodiment of the present disclosure. As shown in FIG. 20, the terminal device 500 includes:

a communication unit 510 configured to Physical Sidelink Shared Channel(s) (PSSCH(s)) to a first terminal on a plurality of carriers; and a processing unit 520 configured to determine that the first terminal transmits the first PSFCH to the second terminal on a first carrier, the first PSFCH including feedback information for a first PSSCH, and the first PSSCH comprising at least one PSSCH transmitted on at least one of the plurality of carriers, and determine a target transmission resource used by the first terminal for transmitting the first PSFCH on the first carrier.

The communication unit 510 is further configured to receive the first PSFCH on the target transmission resource on the first carrier.

In some embodiments of the present disclosure, the plurality of carriers may include:

all carriers for sidelink transmission, carriers available for sidelink transmission by the first terminal, carriers available for sidelink transmission by the terminal device, or carriers on which the first terminal receives the PSSCH(s) from the terminal device.

In some embodiments of the present disclosure, the processing unit 510 may be further configured to:

determine a target slot used by the first terminal for transmitting the first PSFCH on the first carrier according to a first subcarrier spacing.

In some embodiments of the present disclosure, the first subcarrier spacing may be one of:

a subcarrier spacing of the first carrier;

a subcarrier spacing of a carrier where the first PSSCH is located;

a smallest subcarrier spacing among the plurality of carriers;

a largest subcarrier spacing among the plurality of carriers; or a subcarrier spacing determined according to configuration information, wherein the configuration information is pre-configuration information or network configuration information.

In some embodiments of the present disclosure, the processing unit 520 may be further configured to:

determine the target transmission resource used by the first terminal for transmitting the first PSFCH on the first carrier according to a first slot interval and the first subcarrier spacing.

In some embodiments of the present disclosure, the communication unit 510 may be further configured to:

transmit first indication information to the first terminal, the first indication information indicating the first slot interval and the first indication information being carried in Sidelink Control Information (SCI), PC5-Radio Resource Control (PC5-RRC) signaling or Medium Access Control Control Element (MAC CE).

In some embodiments of the present disclosure, the first slot interval may be determined according to pre-configuration information or network configuration information.

In some embodiments of the present disclosure, the first slot interval may be determined according to at least one of a System Information Block (SIB), an RRC message, or Downlink Control Information (DCI).

In some embodiments of the present disclosure, the processing unit 520 may be further configured to:

determine the target slot used by the first terminal for transmitting the first PSFCH on the first carrier according to the first subcarrier spacing and a minimum slot interval between a PSSCH and a PSFCH.

In some embodiments of the present disclosure, the processing unit 520 may be further configured to:

determine the target slot used by the first terminal for transmitting the first PSFCH on the first carrier according to a slot where the first PSSCH is located, a slot size corresponding to the first subcarrier spacing and the minimum slot interval.

In some embodiments of the present disclosure, the first PSSCH may include a PSSCH transmitted on slot n on a second carrier, and the minimum slot interval is K slots, where K is a positive integer, and a slot size of each of the K slots is determined according to the first subcarrier spacing, and the processing unit 520 may be further configured to:

determine the first slot including a PSFCH transmission resource after slot n+K as the target slot used by the first terminal for transmitting the first PSFCH on the first carrier.

In some embodiments of the present disclosure, the minimum slot interval may include a first minimum slot interval and a second minimum slot interval, wherein the first minimum slot interval indicates a minimum slot interval between a PSFCH and a PSSCH associated with the PSFCH when transmitted on a same carrier, and the second minimum slot interval indicates a minimum slot interval between a PSFCH and a PSSCH associated with the PSFCH when transmitted on different carriers.

In some embodiments of the present disclosure, the processing unit 520 may be further configured to:

determine a target minimum slot interval according to a carrier where the first PSSCH is located and a carrier where the first PSFCH is located.

In some embodiments of the present disclosure, the processing unit 520 may be further configured to:

determine the target minimum slot interval according to the carrier where the first PSSCH is located, the carrier where the first PSFCH is located, and a first correspondence, the first correspondence being a correspondence between carriers where PSSCH(s) are located, carriers where PSFCH(s) are located, and minimum slot intervals.

In some embodiments of the present disclosure, the processing unit 520 may be further configured to:

determine the target slot used by the first terminal for transmitting the first PSFCH on the first carrier according to the first subcarrier spacing and the target minimum slot interval.

In some embodiments of the present disclosure, the processing unit 520 may be further configured to:

determine the target transmission resource used by the first terminal for transmitting the first PSFCH on the first carrier according to a carrier index.

In some embodiments of the present disclosure, the processing unit 520 may be further configured to:

determine the target transmission resource used by the first terminal for transmitting the first PSFCH on the first carrier according to a carrier index of a carrier where the first PSSCH is located and/or a carrier index of a carrier where the first PSFCH is located.

In some embodiments of the present disclosure, the processing unit 520 may be further configured to:

determining the target transmission resource used by the first terminal for transmitting the first PSFCH on the first carrier according to:

$$(P_{ID} + M_{ID} + C_{ID}) \mathrm{mod} R_{PRB,CS}^{PSFCH}$$

where $P_{ID}$ represents a source identifier, $M_{ID}$ represents a destination identifier, $C_{ID}$ represents the carrier index of the carrier where the first PSSCH is located or the carrier index of the carrier where the first PSFCH is located, $$R_{PRB,CS}^{PSFCH}$$

represents a transmission resource set available for transmitting the first PSFCH, and mod represents modulo.

In some embodiments of the present disclosure, the processing unit 520 may be further configured to:

determine the target transmission resource used by the first terminal for transmitting the first PSFCH on the first carrier according to a difference between the carrier index of the carrier where the first PSSCH is located and the carrier index of the carrier where the first PSFCH is located.

In some embodiments of the present disclosure, the processing unit 520 may be further configured to:

determine the target transmission resource used by the first terminal for transmitting the first PSFCH on the first carrier according to:

$$(P_{ID} + M_{ID} + C_{ID\_diff}) \mathrm{mod} R_{PRB,CS}^{PSFCH}$$

where $P_{ID}$ represents a source identifier, $M_{ID}$ represents a destination identifier, $C_{ID\_diff}$ represents the difference between the carrier index of the carrier where the first PSSCH is located and the carrier index of the carrier where the first PSFCH is located, $$R_{PRB,CS}^{PSFCH}$$

represents a transmission resource set available for transmitting the first PSFCH, and mod represents modulo.

In some embodiments of the present disclosure, the processing unit 520 may be further configured to:

determine the target transmission resource used by the first terminal for transmitting the first PSFCH on the first carrier according to:

$$(P_{ID} + M_{ID} + C_{ID\_diff} + N * R_{PRB,CS}^{PSFCH}) \mathrm{mod} R_{PRB,CS}^{PSFCH}$$

where $P_{ID}$ represents a source identifier, $M_{ID}$ represents a destination identifier, $C_{ID\_diff}$ represents the difference between the carrier index of the carrier where the first PSSCH is located and the carrier index of the carrier where the first PSFCH is located, $$R_{PRB,CS}^{PSFCH}$$

represents a transmission resource set available for transmitting the first PSFCH, mod represents modulo, and N is an integer.

In some embodiments of the present disclosure, the processing unit 520 may be further configured to:

determine the target transmission resource used by the first terminal for transmitting the first PSFCH on the first carrier according to a first resource index.

In some embodiments of the present disclosure, the processing unit 520 may be further configured to:

determine the target transmission resource used by the first terminal for transmitting the first PSFCH on the first carrier according to:

$$I_{index2} = (P_{ID} + M_{ID} + I_{index1}) \mathrm{mod} R_{PRB,CS}^{PSFCH}; \text{ or}$$

$$I_{index2} = I_{index1} \mathrm{mod} R_{PRB,CS}^{PSFCH}; \text{ or}$$

$$I_{index2} = I_{index1}$$

where $P_{ID}$ represents a source identifier, $M_{ID}$ represents a destination identifier, $I_{index1}$ represents the resource index indicated by the second indication information, $I_{index2}$ represents a resource index of the target transmission resource, $$R_{PRB,CS}^{PSFCH}$$

represents a transmission resource set available for transmitting the first PSFCH, and mod represents modulo.

In some embodiments of the present disclosure, the communication unit 510 may be further configured to:

transmit second indication information to the first terminal, the second indication information indicating the first resource index, and the second indication information being carried in SCI, PC5-RRC or MAC CE.

In some embodiments of the present disclosure, the first resource index may be obtained from pre-configuration information or network configuration information, the network configuration information including at least one of an SIB, an RRC message, or Downlink Control Information (DCI).

In some embodiments of the present disclosure, the processing unit 520 may be further configured to:

divide a first transmission resource set for PSFCH transmission according to the plurality of carriers, to obtain a transmission resource set corresponding to each of the plurality of carriers; and determine the target transmission resource used by the first terminal for transmitting the first PSFCH in the transmission resource set corresponding to the first carrier.

In some embodiments of the present disclosure, the first transmission resource set may include a first PRB set available for PSFCH transmission in one PSFCH slot, and the processing unit 520 may be further configured to:

divide the first PRB set available for PSFCH transmission in one PSFCH slot according to the plurality of carriers, to obtain a second PRB set available for PSFCH transmission corresponding to each of the plurality of carriers.

In some embodiments of the present disclosure, the processing unit 520 may be further configured to:

determine the second PRB set available for PSFCH transmission corresponding to each carrier according to:

$$M_{PRB,set,c}^{PSFCH} = \mathrm{floor}(M_{PRB,set}^{PSFCH} / \mathrm{N\_c}) \text{ or } M_{PRB,set,c}^{PSFCH} = \mathrm{ciel}(M_{PRB,set}^{PSFCH} / \mathrm{N\_c})$$

where $$M_{PRB,set}^{PSFCH}$$

represents the first PRB set available for PSFCH transmission in one PSFCH slot, $$M_{PRB,set,c}^{PSFCH}$$

represents the second PRB set available for PSFCH transmission corresponding to carrier c in one PSFCH slot, N\_c represents a number of carriers included in the plurality of carriers, floor represents rounding down, and ceil represents rounding up.

In some embodiments of the present disclosure, the first transmission resource set may include a third PRB set available for PSFCH transmission corresponding to a PSSCH of one subchannel and one slot, and the processing unit 520 may be further configured to:

divide the third PRB set available for PSFCH transmission corresponding to the PSSCH of the one subchannel and the one slot according to the plurality of carriers, to obtain a fourth PRB set available for PSFCH transmission corresponding to the PSSCH of the one subchannel and the one slot corresponding to each of the plurality of carriers.

In some embodiments of the present disclosure, the processing unit 520 may be further configured to:

determine the fourth PRB set available for PSFCH transmission corresponding to the PSSCH of the one subchannel and the one slot corresponding to each carrier according to:

$$M_{subch,slot,c}^{PSFCH} = \mathrm{floor}(M_{subch,slot}^{PSFCH} / \mathrm{N\_c}) \text{ or } M_{subch,slot,c}^{PSFCH} = \mathrm{ciel}(M_{subch,slot}^{PSFCH} / \mathrm{N\_c})$$

where

US 12,610,383 B2

49

$$M_{subch,slot}^{PSFCH}$$

represents the third PRB set available for PSFCH transmission corresponding to the PSSCH of the one subchannel and the one slot, $$M_{subch,slot,c}^{PSFCH}$$

represents the fourth PRB set available for PSFCH transmission corresponding to the PSSCH of the one subchannel and the one slot corresponding to carrier c, and N_c represents a number of carriers included in the plurality of carriers, floor represents rounding down, and ceil represents rounding up.

In some embodiments of the present disclosure, $$M_{subch,slot}^{PSFCH}$$

may be determined according to:

$$M_{subch,slot}^{PSFCH} = M_{PRB,set}^{PSFCH} / \left(N_{subch} \cdot N_{PSSCH}^{PSFCH}\right)$$

where $$M_{PRB,set}^{PSFCH}$$

represents a number of PRBs available for PSFCH transmission in one PSFCH slot;

$N_{subch}$ represents a number of subchannels included in a resource pool of a carrier where a PSFCH is located, or a number of subchannels included in a resource pool of a carrier where a PSSCH is located;

$$N_{PSSCH}^{PSFCH}$$

represents a number of PSSCH slots associated with the PSFCH slot in the resource pool of the carrier where the PSFCH is located, or a number of PSSCH slots associated with the PSFCH slot in the resource pool of the carrier where the PSSCH is located.

In some embodiments of the present disclosure the first transmission resource set may include a resource set available for transmitting the first PSFCH, and the processing unit 520 may be further configured to:

divide the resource set available for transmitting the first PSFCH according to the plurality of carriers, to obtain a resource set available for transmitting the first PSFCH corresponding to each of the plurality of carriers.

In some embodiments of the present disclosure, the processing unit 520 may be further configured to:

determine the resource set available for transmitting the first PSFCH corresponding to each carrier according to:

$$R_{PRB,CS,c}^{PSFCH} = floor\left(R_{PRB,CS}^{PSFCH} / N\_c\right) \text{ or } R_{PRB,CS,c}^{PSFCH} = ciel\left(R_{PRB,CS}^{PSFCH} / N\_c\right)$$

50 wherein $$R_{PRB,CS,c}^{PSFCH}$$

represents a resource set available for transmitting the first PSFCH corresponding to carrier c, $$R_{PRB,CS}^{PSFCH}$$

represents the resource set available for transmitting the first PSFCH, N_c represents a number of carriers included in the plurality of carriers, floor represents rounding down, and ceil represents rounding up.

In some embodiments of the present disclosure, $$R_{PRB,CS}^{PSFCH}$$

may be determined according to:

$$R_{PRB,CS}^{PSFCH} = N_{type}^{PSFCH} \cdot M_{subch,slot}^{PSFCH} \cdot N_{CS}^{PSFCH}$$

wherein $$N_{CS}^{PSFCH}$$

represents a number of Cyclic Shift (CS) pairs, $$M_{subch,slot}^{PSFCH}$$

represents the PRB set available for PSFCH transmission corresponding to a PSSCH of one subchannel and one slot, and $$N_{type}^{PSFCH}$$

is 1 or $$N_{subch}^{PSSCH},$$

where $$N_{subch}^{PSSCH}$$

represents a number of subchannels occupied by the PSSCH.

Optionally, in some embodiments, the above communication unit may be a communication interface or a transceiver, or an input/output interface of a communication chip or a system-on-chip. The above processing unit may be one or more processors.

It can be appreciated that the terminal device 500 according to the embodiment of the present disclosure may correspond to the second terminal in the method embodiment of the present disclosure, and the above and other operations and/or functions of the respective units in the terminal device 500 are provided for the purpose of implementing the process flow corresponding to the second terminal in the method 200 shown in FIG. 15, and details thereof will be not omitted here for brevity.

Figure 21:
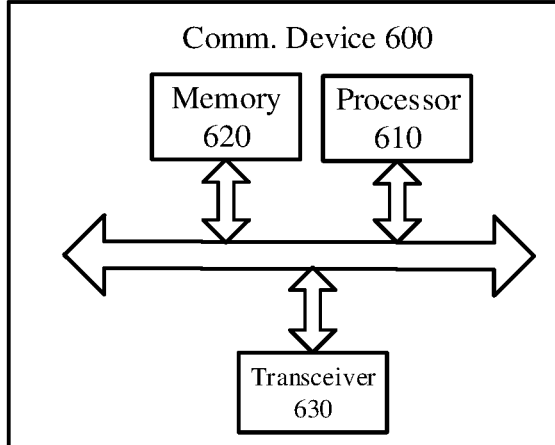
FIG. 21 is a schematic block diagram of a communication device according to an embodiment of the present disclosure.

FIG. 21 is a schematic diagram showing a structure of a communication device 600 according to an embodiment of the present disclosure. The communication device 600 shown in FIG. 21 includes a processor 610, and the processor 610 can invoke and execute a computer program from a memory to implement the method in the embodiment of the present disclosure.

Optionally, as shown in FIG. 21, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, as shown in FIG. 21, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the first terminal according to the embodiment of the present disclosure, and the communication device 600 may implement the corresponding processes implemented by the first terminal in any of the methods according to the embodiments of the present disclosure. For the sake of brevity, details thereof will be omitted here.

In some embodiments, the transceiver 630 in the communication device 600 may correspond to the communication unit 410 in the terminal device 400 shown in FIG. 19, and the transceiver 630 may perform the operations or functions performed by the communication unit 510. For the sake of brevity, details thereof will be omitted here.

In some embodiments, the processor 610 in the communication device 600 may correspond to the processing unit 420 in the terminal device 400 shown in FIG. 19, and the processor 610 may perform the operations or functions performed by the processing unit 420. For the sake of brevity, details thereof will be omitted here.

Optionally, the communication device 600 may specifically be the second terminal according to the embodiment of the present disclosure, and the communication device 600 may implement the corresponding processes implemented by the second terminal in any of the methods according to the embodiments of the present disclosure. For the sake of brevity, details thereof will be omitted here.

In some embodiments, the transceiver 630 in the communication device 600 may correspond to the communication unit 510 in the terminal device 500 shown in FIG. 20, and the transceiver 630 may perform the operations or functions performed by the communication unit 510. For the sake of brevity, details thereof will be omitted here.

In some embodiments, the processor 610 in the communication device 600 may correspond to the processing unit

520 in the terminal device 500 shown in FIG. 20, and the processor 610 may perform the operations or functions performed by the processing unit 520. For the sake of brevity, details thereof will be omitted here.

Figure 22:
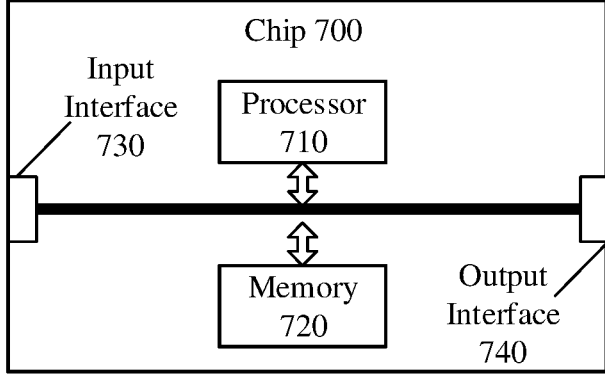
FIG. 22 is a schematic block diagram of a chip according to an embodiment of the present disclosure.

FIG. 22 is a schematic diagram showing a structure of a chip according to an embodiment of the present disclosure. The chip 700 shown in FIG. 22 includes a processor 710, and the processor 710 can invoke and execute a computer program from a memory to implement the method in the embodiment of the present disclosure.

Optionally, as shown in FIG. 22, the chip 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, the chip 700 may further include an input interface 730. The processor 810 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the first terminal in the embodiment of the present disclosure, and the chip can implement the corresponding processes implemented by the first terminal in the various methods of the embodiments of the present disclosure. For the sake of brevity, details thereof will be omitted here.

In some embodiments, the processor 710 in the chip 700 may correspond to the processing unit 420 in the terminal device 400 shown in FIG. 19, and the processor 710 may perform the operations or functions performed by the processing unit 420. For the sake of brevity, details thereof will be omitted here.

In some embodiments, the input interface 730 and the output interface 740 in the chip 700 may correspond to the communication unit 410 in the terminal device 400 shown in FIG. 19. The input interface 730 and the output interface 740 may perform the operations or functions performed by the communication unit 410. For the sake of brevity, details thereof will be omitted here.

Optionally, the chip can be applied to the second terminal in the embodiment of the present disclosure, and the chip can implement the corresponding processes implemented by the second terminal in the various methods of the embodiments of the present disclosure. For the sake of brevity, details thereof will be omitted here.

In some embodiments, the processor 710 in the chip 700 may correspond to the processing unit 520 in the terminal device 500 shown in FIG. 20, and the processor 710 may perform the operations or functions performed by the processing unit 520. For the sake of brevity, details thereof will be omitted here.

In some embodiments, the input interface 730 and the output interface 740 in the chip 700 may correspond to the communication unit 510 in the terminal device 500 shown in FIG. 20. The input interface 730 and the output interface 740 may perform the operations or functions performed by the communication unit 510. For the sake of brevity, details thereof will be omitted here.

It can be appreciated that the chip in the embodiment of the present disclosure may also be referred to as a system-level chip, a system-chip, a chip system, or a system-on-chip.

Figure 23:
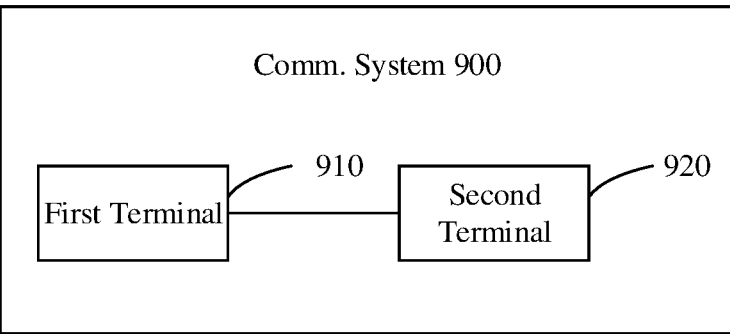
FIG. 23 is a schematic block diagram of a communication system according to an embodiment of the present disclosure.

FIG. 23 is a schematic block diagram showing a communication system 700 according to an embodiment of the present disclosure. As shown in FIG. 23, the communication system 700 includes a first terminal 710 and a second terminal 720.

Here, the first terminal 710 can be configured to implement the corresponding functions implemented by the first terminal in the above method, and the second terminal 720 can be configured to implement the corresponding functions implemented by the second terminal in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the first terminal in the embodiment of the present disclosure, and the computer program can cause a computer to perform corresponding procedures implemented by the first terminal in the method according to any of the embodiments of the present disclosure. Details thereof will be omitted here for simplicity.

Optionally, the computer readable storage medium can be applied to the second terminal in the embodiment of the present disclosure, and the computer program can cause a computer to perform corresponding procedures implemented by the second terminal in the method according to any of the embodiments of the present disclosure. Details thereof will be omitted here for simplicity.

An embodiment of the present disclosure also provides a computer program product including computer program instructions.

Optionally, the computer program product can be applied to the first terminal in the embodiment of the present disclosure, and the computer program instructions can cause a computer to perform corresponding procedures implemented by the first terminal in the method according to any of the embodiments of the present disclosure. Details thereof will be omitted here for simplicity.

Optionally, the computer program product can be applied to the second terminal in the embodiment of the present disclosure, and the computer program instructions can cause a computer to perform corresponding procedures implemented by the second terminal in the method according to any of the embodiments of the present disclosure. Details thereof will be omitted here for simplicity.

An embodiment of the present disclosure also provides a computer program.

Optionally, the computer program can be applied to the first terminal in the embodiment of the present disclosure. The computer program, when executed on a computer, can cause the computer to perform corresponding procedures implemented by the first terminal in the method according to any of the embodiments of the present disclosure. Details thereof will be omitted here for simplicity.

Optionally, the computer program can be applied to the second terminal in the embodiment of the present disclosure. The computer program, when executed on a computer, can cause the computer to perform corresponding procedures implemented by the second terminal in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A Physical Sidelink Feedback Channel (PSFCH) transmission method, comprising:
   receiving, by a first terminal, Physical Sidelink Shared Channel(s) (PSSCH(s)) transmitted by a second terminal on a plurality of carriers;
   determining, by the first terminal, to transmit a first PSFCH to the second terminal on a first carrier, the first PSFCH comprising feedback information for a first PSSCH, and the first PSSCH comprising at least one PSSCH transmitted on at least one of the plurality of carriers;

determining, by the first terminal, a target transmission resource for transmitting the first PSFCH on the first carrier; and
   transmitting, by the first terminal, the first PSFCH on the target transmission resource on the first carrier;
   wherein determining, by the first terminal, the target transmission resource for transmitting the first PSFCH on the first carrier comprises:
   determining, by the first terminal, a target slot for transmitting the first PSFCH based on a first subcarrier spacing and a minimum slot interval between a PSSCH and a PSFCH;
   wherein the method further comprises:
   determining a target minimum slot interval based on a carrier where the first PSSCH is located and a carrier where the first PSFCH is located.

2. The method according to claim 1, wherein the plurality of carriers comprises:
   all carriers for sidelink transmission,
   carriers available for sidelink transmission by the first terminal,
   carriers available for sidelink transmission by the second terminal, or
   carriers on which the first terminal receives the PSSCH(s) transmitted by the second terminal.

3. The method according to claim 1, wherein the first subcarrier spacing is one of:
   a subcarrier spacing of the first carrier;
   a subcarrier spacing of a carrier where the first PSSCH is located;
   a smallest subcarrier spacing among the plurality of carriers;
   a largest subcarrier spacing among the plurality of carriers; or
   a subcarrier spacing determined based on configuration information,
   wherein the configuration information is pre-configuration information or network configuration information.

4. The method according to claim 1, wherein said determining, by the first terminal, the target slot for transmitting the first PSFCH based on the first subcarrier spacing and the minimum slot interval between the PSSCH and the PSFCH comprises:
   determining the target slot for transmitting the first PSFCH based on the first subcarrier spacing and the target minimum slot interval.

5. The method according to claim 1, wherein said determining, by the first terminal, the target transmission resource for transmitting the first PSFCH on the first carrier comprises:
   determining, by the first terminal, the target transmission resource for transmitting the first PSFCH on the first carrier based on a carrier index.

6. The method according to claim 5, wherein said determining, by the first terminal, the target transmission resource for transmitting the first PSFCH on the first carrier based on the carrier index comprises:
   determining the target transmission resource for transmitting the first PSFCH on the first carrier based on a carrier index of the carrier where the first PSSCH is located and/or a carrier index of the carrier where the first PSFCH is located.

7. The method according to claim 1, wherein said determining, by the first terminal, the target transmission resource for transmitting the first PSFCH on the first carrier comprises:

obtaining, by the first terminal, second indication information comprising a resource index; and determining, by the first terminal, the target transmission resource for transmitting the first PSFCH on the first carrier based on the resource index.

8. A Physical Sidelink Feedback Channel (PSFCH) transmission method, comprising:

transmitting, by a second terminal, Physical Sidelink Shared Channel(s) (PSSCH(s)) to a first terminal on a plurality of carriers;

determining, by the second terminal, that the first terminal transmits a first PSFCH to the second terminal on a first carrier, the first PSFCH comprising feedback information for a first PSSCH, and the first PSSCH comprising at least one PSSCH transmitted on at least one of the plurality of carriers;

determining, by the second terminal, a target transmission resource used by the first terminal for transmitting the first PSFCH on the first carrier; and receiving, by the second terminal, the first PSFCH on the target transmission resource on the first carrier;

wherein determining, by the second terminal, the target transmission resource used by the first terminal for transmitting the first PSFCH on the first carrier comprises:

determining a target slot used by the first terminal for transmitting the first PSFCH on the first carrier based on a first subcarrier spacing and a minimum slot interval between a PSSCH and a PSFCH;

wherein the method further comprises:

determining a target minimum slot interval based on a carrier where the first PSSCH is located and a carrier where the first PSFCH is located.

9. The method according to claim 8, wherein the plurality of carriers comprises:

all carriers for sidelink transmission, carriers available for sidelink transmission by the first terminal, carriers available for sidelink transmission by the second terminal, or carriers on which the first terminal receives the PSSCH(s) from the second terminal.

10. The method according to claim 8, wherein the first subcarrier spacing is one of:

a subcarrier spacing of the first carrier;

a subcarrier spacing of a carrier where the first PSSCH is located;

a smallest subcarrier spacing among the plurality of carriers;

a largest subcarrier spacing among the plurality of carriers; or a subcarrier spacing determined based on configuration information, wherein the configuration information is pre-configuration information or network configuration information.

11. The method according to claim 8, wherein said determining the target slot used by the first terminal for transmitting the first PSFCH on the first carrier based on the first subcarrier spacing and the minimum slot interval between the PSSCH and the PSFCH comprises:

determining the target slot used by the first terminal for transmitting the first PSFCH on the first carrier based on the first subcarrier spacing and the target minimum slot interval.

12. The method according to claim 8, wherein said determining, by the second terminal, the target transmission resource used by the first terminal for transmitting the first PSFCH on the first carrier comprises:

determining the target transmission resource used by the first terminal for transmitting the first PSFCH on the first carrier based on a carrier index.

13. The method according to claim 12, wherein said determining the target transmission resource used by the first terminal for transmitting the first PSFCH on the first carrier based on the carrier index comprises:

determining the target transmission resource used by the first terminal for transmitting the first PSFCH on the first carrier based on a carrier index of the carrier where the first PSSCH is located and/or a carrier index of the carrier where the first PSFCH is located.

14. A terminal device, comprising a processor and a memory, wherein the memory has a computer program stored thereon, and the processor is configured to invoke and execute the computer program stored in the memory to perform a Physical Sidelink Feedback Channel (PSFCH) transmission method comprising:

receiving Physical Sidelink Shared Channel(s) (PSSCH(s)) transmitted by a second terminal on a plurality of carriers;

determining to transmit a first PSFCH to the second terminal on a first carrier, the first PSFCH comprising feedback information for a first PSSCH, and the first PSSCH comprising at least one PSSCH transmitted on at least one of the plurality of carriers;

determining a target transmission resource for transmitting the first PSFCH on the first carrier; and transmitting the first PSFCH on the target transmission resource on the first carrier;

wherein determining the target transmission resource for transmitting the first PSFCH on the first carrier comprises:

determining a target slot for transmitting the first PSFCH based on a first subcarrier spacing and a minimum slot interval between a PSSCH and a PSFCH;

wherein the method further comprises:

determining a target minimum slot interval based on a carrier where the first PSSCH is located and a carrier where the first PSFCH is located.

15. The terminal device according to claim 14, wherein the plurality of carriers comprises:

all carriers for sidelink transmission, carriers available for sidelink transmission by the first terminal, carriers available for sidelink transmission by the second terminal, or carriers on which the first terminal receives the PSSCH(s) transmitted by the second terminal.

16. The terminal device according to claim 14, wherein the first subcarrier spacing is one of:

a subcarrier spacing of the first carrier;

a subcarrier spacing of a carrier where the first PSSCH is located;

a smallest subcarrier spacing among the plurality of carriers;

a largest subcarrier spacing among the plurality of carriers; or a subcarrier spacing determined based on configuration information, wherein the configuration information is pre-configuration information or network configuration information.

17. The terminal device according to claim 14, wherein said determining the target slot for transmitting the first PSFCH based on the first subcarrier spacing and the minimum slot interval between the PSSCH and the PSFCH comprises:

determining the target slot for transmitting the first PSFCH based on the first subcarrier spacing and the target minimum slot interval.

18. The terminal device according to claim 14, wherein said determining the target transmission resource for transmitting the first PSFCH on the first carrier comprises:

determining the target transmission resource for transmitting the first PSFCH on the first carrier based on a carrier index.

19. The terminal device according to claim 18, wherein said determining the target transmission resource for transmitting the first PSFCH on the first carrier based on the carrier index comprises:

determining the target transmission resource for transmitting the first PSFCH on the first carrier based on a carrier index of the carrier where the first PSSCH is located and/or a carrier index of the carrier where the first PSFCH is located.

20. The terminal device according to claim 14, wherein said determining the target transmission resource for transmitting the first PSFCH on the first carrier comprises:

obtaining second indication information comprising a resource index; and determining the target transmission resource for transmitting the first PSFCH on the first carrier based on the resource index.

\* \* \* \* \*